US007677895B2

(12) United States Patent
Miller

(10) Patent No.: US 7,677,895 B2
(45) Date of Patent: Mar. 16, 2010

(54) ARITHMETIC MEASUREMENT SYSTEM

(76) Inventor: Anthony Miller, 704 Teal Ave., Kissimmee, FL (US) 34747

( * ) Notice: Subject to any disclaimer, the term of this patent is extended or adjusted under 35 U.S.C. 154(b) by 255 days.

(21) Appl. No.: 11/379,928

(22) Filed: Apr. 24, 2006

(65) Prior Publication Data

US 2007/0248939 A1 Oct. 25, 2007

(51) Int. Cl.
*G09B 23/02* (2006.01)
(52) U.S. Cl. .................. 434/188; 434/191; 434/206; 434/189
(58) Field of Classification Search ............ 434/191, 434/188, 203
See application file for complete search history.

(56) References Cited

U.S. PATENT DOCUMENTS

| 1,981,154 | A | * | 11/1934 | Simmonds, Jr. | ............. 273/151 |
| 3,469,325 | A | * | 9/1969 | Greenberg | ................. 434/167 |
| 5,868,393 | A | * | 2/1999 | Williams | .................... 273/299 |
| 6,109,924 | A | * | 8/2000 | Sanford et al. | ............... 434/191 |
| 6,910,893 | B2 | * | 6/2005 | Dillhoff | ...................... 434/129 |
| 7,014,191 | B2 | * | 3/2006 | Nasco | ........................ 273/292 |

* cited by examiner

*Primary Examiner*—Gene Kim
*Assistant Examiner*—Michael D Dennis

(57) ABSTRACT

Arithmetic Measurement System quantifies arithmetic operations just by measurement and without arithmetic calculation or even counting. Playing cards may be annotated with size-coded marks or card tags to represent face value. For example, a tag representing a face value 5 is half the size of one representing a value 10 using a linear tag scale, or about $7/10^{th}$ the size using a $\log_{10}$ tag scale. Users align linear tags in a contiguous row to add values or overlap tags to subtract values. Users align logarithmic tags in a row to multiply values or overlap tags to divide values. Integrated and separate measures with corresponding linear or logarithmic tag-scales quantify a total value of aggregate or net tag row size. Product developers may use the Arithmetic Measurement System of tags and measures to provide novel educational math manipulatives and playing card games for players unskilled in arithmetic.

2 Claims, 18 Drawing Sheets

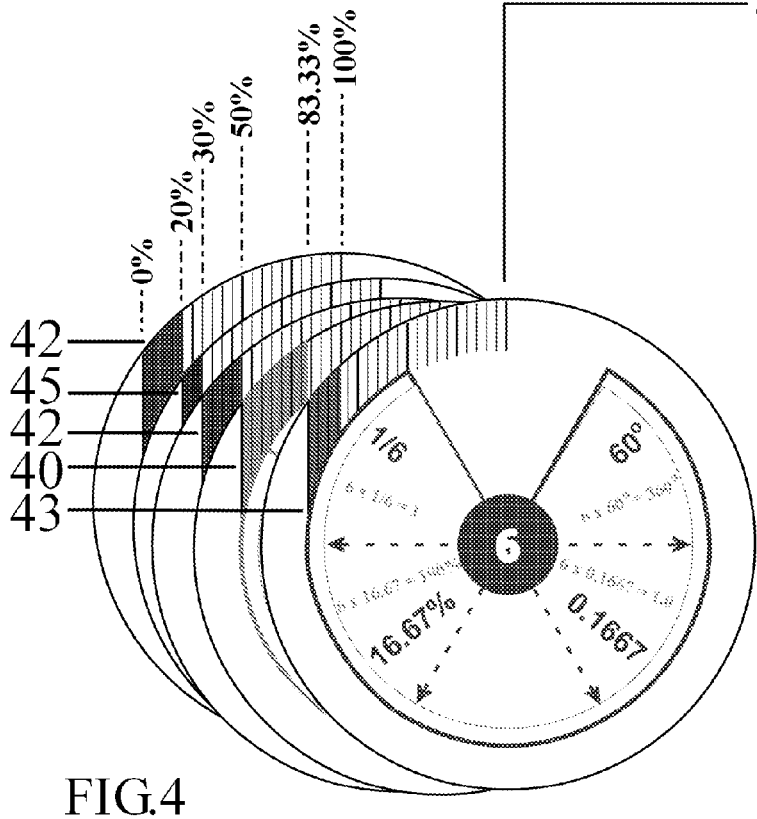
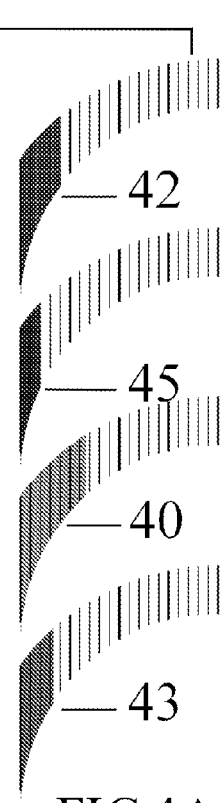
FIG.4 FIG.4A
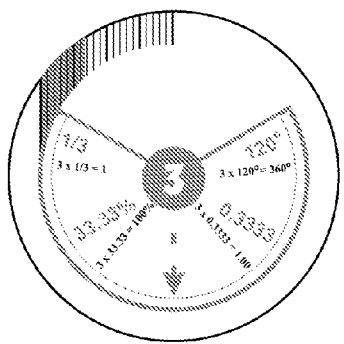
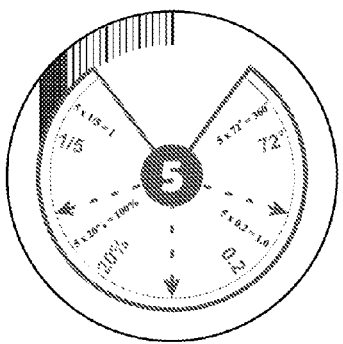
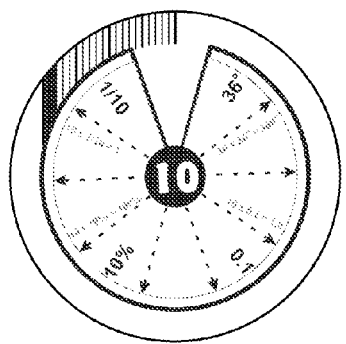
FIG.4B  FIG.4C  FIG.4D

ARITHMETIC MEASUREMENT SYSTEM

COPYRIGHT NOTICE

A portion of the disclosure of this patent document, including Figures, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to math education and card games. More particularly, but not by way of limitation, this invention relates to an arithmetic measurement system of tags and measures in which players with minimal math and reading skills learn to associate, add subtract multiply and divide fractions, decimals, percentages and degree values to determine a group value through play, and advanced players compete and strive for mastery.

BACKGROUND OF THE INVENTION

Prior Art

We are surrounded by basic math. We deal in fractional, percentage and decimal and even degree-based measurement systems everyday, often without any real understanding.

The Nation's Report Card by the National Assessment of Educational Progress (NAEP) shows very little improvement in U.S. student math scores since 1973. Meanwhile other counties forge ahead. The 2003 OECD Programme for International Student Assessment (PISA) shows many industrialized nations such as Japan, Korea and Canada with significantly higher achievement in mathematics literacy than US students.

Numerous games in prior art utilize playing cards for basic math education. These games would not be suitable for the purpose of the present invention as described herein below.

Some educational card games deal with just one measurement or number system such as fractions, and show no relationship to other measurement or number systems. Most math games assume a level of competence or familiarity with the underlying math concepts and are unsuitable for rank beginners.

Also most educational card games are limited to one game and a single math operation such as addition.

Some math games use costly equipment such as game boards. These are too expensive for many users.

Other educational card games suit serious-minded players only who want to learn. These offer few fun-in-learning opportunities and are unlikely to generate spontaneous play amongst average students.

Objects and Advantages

The subject invention is an arithmetic measurement system adaptable to any measurement or number system. In a preferred embodiment it encompasses the addition and subtraction of four measurement or number systems, namely fractions, decimals, percentages and degrees. In other embodiments the arithmetic measurement system supports multiplication and division also.

It offers a visual method to compare values and interrelationships and to determine a group value without any need to understand or use the underlying math concepts. Rank beginners become familiar with these mathematical concepts and their relationships simultaneously during play and without prerequisite study.

The arithmetic measurement system offers many different card games. It should appeal to novices, intermediate and advanced students alike. It may be customized for any measurement or number system and for any audience in any language and for any level of math proficiency.

This game system is inexpensive. In its basic embodiment it comprises a single deck of playing cards.

Players start with images and graduate to symbols and numbers at their own pace. Gradually through play, players learn to associate specific numerical values with specific pictures. With practice players start to comprehend arithmetic and should in time become skilled in addition, subtraction, multiplication and division.

And the best part is that learning occurs semi-automatically while having fun playing cards.

Accordingly, several objects and advantages of the arithmetic measurement system are as follows:

(a). A first object is to provide specially marked playing cards that allow anyone even without formal math and reading education to:

acquire a basic understanding of arithmetic operations including addition, subtraction, multiplication and division;
  acquire a basic understanding of equivalent and comparative fractions, decimals, percentages and degree values and their interrelationships just through play;
  convert between basic fractions, decimals, percentages and degrees at will;
  add, subtract, multiply and divide whole numbers, fractions, decimals and percentages to determine a group value;
  review cards in hand without exposing them to opposing players;
  evaluate potentially winning combinations visually;
  compile a target value proficiently and without recourse to formal mathematics.

(b). A second object is to provide a game system for one or more players of any age group, educational and skill level that:

resembles a standard playing card deck and so has ready acceptance and broad appeal;
  can be used to play variations of popular card games;
  offers a wide range of new games limited only by the imagination of developers and players;
  offers fun-in-learning opportunities in both home and school environments;
  appeals to children and induces them to play spontaneously and practice these concepts amongst themselves with little or no adult supervision or direction;
  intrigues and challenges even the most advanced players.

(c). A third object is to provide an arithmetic measurement system that is inclusive:

has a wide range of interchangeable equivalent indicia including colors, pictures, symbols and numerals that make play and learning accessible to most players;
  provides for novices with little or no math education or understanding of the mathematical concepts involved and with only limited reading ability;
  is low cost and customizable for any audience including minority groups, players with learning disabilities or special needs, special interest groups, underprivileged people and developing nations worldwide regardless of demographic;

is language-independent and easily adapted for worldwide use with local character and symbol sets.

Still further objects and advantages will become apparent from a consideration of the ensuing description and drawings.

SUMMARY

In accordance with the present invention an arithmetic measurement system comprises a set of specially marked playing cards and a measure. The cards offer fun, interesting, and effective ways to learn and practice arithmetic. Even players unskilled in arithmetic, and even counting, may add subtract multiply or divide face values just by measurement.

3. Peripheral indicia denote face value and suit. Overlapped cards may be viewed, melded and aggregated in hand without exposure. Specific peripheral indicia or tags are coded to denote face value in accordance with a predetermined measurement system.
2. A measure is calibrated in accordance with the predetermined tag scale to quantify individual and group face values. It quantifies the length of a row of contiguous card tags, one from each card, or the difference between two overlapping card tags, or the difference between two rows of one or more card tags, directly into a group value in any measurement or number system. Players do not need to know measurement or number system or the underlying math. Addition, subtraction, multiplication and division may be supported.
3. Measures may be integrated into the card indicia or be separate. Slot measures and Template measures may be shared. Clip measures help players hold align and cards in hand.
4. Informational indicia on card faces and backs denote hints and strategies to speed learning and play. They may include pictographs, mathematical equations, notes, and segment charts and data sheets.

BRIEF DESCRIPTION OF THE DRAWINGS

In the drawings, closely related Figures have the same number but different alphabetic suffixes. The arithmetic measurement system can better be understood from the following detailed description of a preferred embodiment of the invention and by referring to the illustrative drawings in which:

FIG. 4 illustrates a Meld of Round Cards with Asymmetric Tags;

FIG. 4A illustrates a Asymmetric Tag and Curved Measure detail;

FIG. 4B illustrates a Face of a Round Number-3 Card;

FIG. 4C illustrates a Face of a Round Number-5 Card;

FIG. 4D illustrates a Face of a Round Number-10 Card;

FIG. 10A illustrates a Small Hand-held Clip Measure—Plan View;

DRAWINGS—REFERENCE NUMERALS

Figure 1:
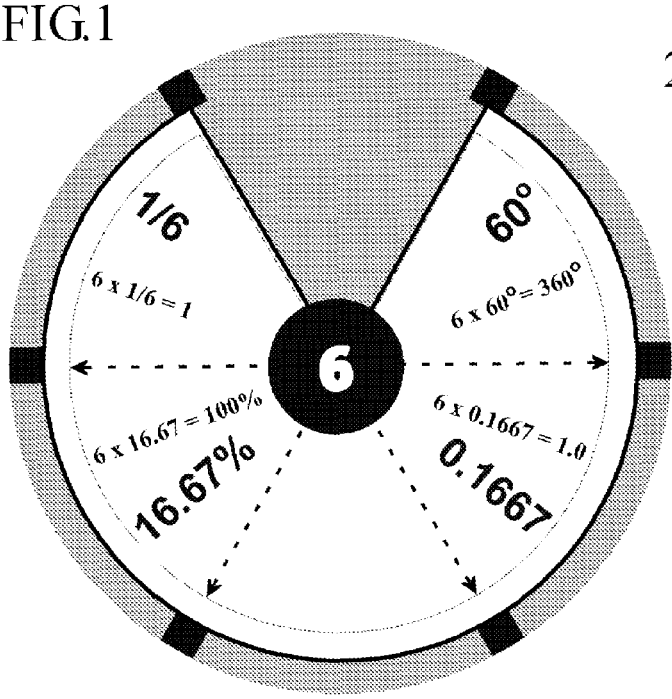
FIG. 1 illustrates a Face of a Round-shaped Number-6 Card.

20 Segment (share, portion, fraction)
22 Segment Layout (map, plan)
23 Segment Bar Chart
24 Segment Boundary
26 Suit Marker
28 Card Number
29 Information Area
30 Fractional Value 31 Fractional Hint
32 Percentage Value
33 Percentage Hint
34 Degree Value
35 Degree Hint
36 Decimal Value
37 Decimal Hint
40 Number-3 Card Tag
42 Number-5 Card Tag
43 Number-6 Card Tag
45 Number-10 Card Tag
49 Integrated Measure
50 #3 Segment Ring
51 #4 Segment Ring
52 #5 Segment Ring
53 #6 Segment Ring
54 #8 Segment Ring
55 #10 Segment Ring
56 #12 Segment Ring
57 #20 Segment Ring
58 Publicity Area
60 Body
61 Clip
62 Card Platform
63 Grip
64 Clamp
65 Magnifying Lens
66 Percentage Measure
67 Fraction Measure
68 Decimal Measure
69 Degree Measure
70 Hinge
71 Finger Hole
72 Card Slot
73 Inclined Slot
74 Composite Curved Measure—Progress
75 Composite Curved Measure—Required
76 Double Percentage Measure
77 Double Fraction Measure
78 Double Decimal Measure
79 Double Degree Measure

DETAILED DESCRIPTION

A preferred embodiment of this invention is a single deck of playing cards. Playing cards are economical, widely accepted and easily customized. They are readily available in a variety of shapes, sizes, colors and materials. Round or rectangular-shaped playing cards suit different audiences and markets.

Round-shaped cards may be considered more eye-catching than rectangular cards. Their appeal may generate spontaneous play. A round card is a natural choice for pie-shaped segments. It permits a symmetrical and pleasing design. However curved edges complicate tags and meld value measurement.

Rectangular cards are more popular and much cheaper than round cards. Straight edges simplify tag alignment and measurement. The poker-sized format (62 mm×88 mm/2½ in×3½ in; ISO 216 B8) is preferred for this application, although any size/format may be used as a matter of design choice.

Deck: The deck comprises 52 number cards. Each number card belongs to a designated suit. A card number designates individual face value and rank. Ranks depend upon intended use. Jokers are optional.

Face Value or Rank: In a preferred embodiment face values are expressed as portions. The card number is a divisor, so portion size and card number are inversely proportional. A high card number defines a small portion size, etc. Practical considerations limit minimum portion size, for example one-twentieth of one whole unit. Advanced decks may use multiple portions, for example three one-fifths.

Suit: A preferred embodiment uses the standard playing card deck arrangement of four 13-card suits. This familiar format should ease acceptance, use, play and thus learning. Also this format can be used to play many popular non-math card games. However, non-standard suits are also contemplated herein.

Color-coded Indicia: Regardless of suit all number cards of the same face value preferably share a unique and distinguishable color code. Thus color designates rank, value or portion size. The information contained on all card backs is also preferably color-coded with the same color-coding scheme as the faces.

Color-coding preferably befits each specific application. The actual card set, color perception and economic factors are involved. Colors may be designed to be easily discernible and visually differentiated to avoid confusion and so speed play. Colors are preferably consistently reproducible and the production process preferably cost effective. If possible, colors can have associative qualities also.

Game Objective Game developers may set their own specific game objectives. A common math game objective is to meld several number cards together from the same suit to make one whole unit.

Example: A meld of two number-5 cards (one-fifth each), one number-10 (one-tenth), one number-3 card (one-third) and one number-6 card (one-sixth) totals one whole unit. This example meld will be used throughout for ease of reference.

A preferred embodiment for the general market is a rectangular-shaped card with integrated measure. Separate measures are desirable with round-shaped cards. Both card shapes are viable and will be covered in sufficient detail to allow game developers to offer customized game sets for their specific applications.

FIG. 1 shows the face of a sample round-shaped number-6 card.

The number-6 card is all about the number six. The rank of a number-6 card is one-sixth part share portion of one whole unit. All indicia on a number-6 card are colored pink, for example.

To appeal to the widest possible audience the number-6 card has a plurality of interchangeable indicia types designating its face value. Preferably, the card has seven interchangeable indicia types and color-coding to designate its one-sixth face value. Some players may focus on images. Others may use one of four measurement systems. Still others may use only color.

Figure 1A:
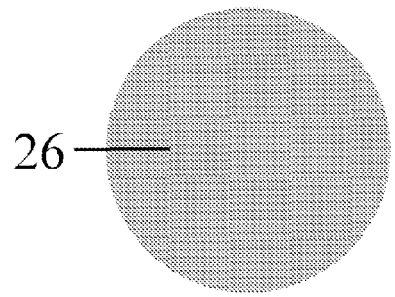
FIG. 1A illustrates a Round-shaped Card Suit Marker.

Suit Marker—FIG. 1A

A suit marker 26 is a unique suit identifier like the ubiquitous ♣ ♦ ♥ ♠ suits. It is visible from the card edge. Players may slide or fan cards open to see all suit markers without exposing any card. Preferably, marker 26 is easily recognizable and distinguishable from other suit markers.

Markers may be icons, symbols, patterns or images, preferably well known. For example, a game developer could use/•%° to designate 'fraction', 'decimal' 'percentage' and 'degree' suits respectively if desired.

Figure 1B:
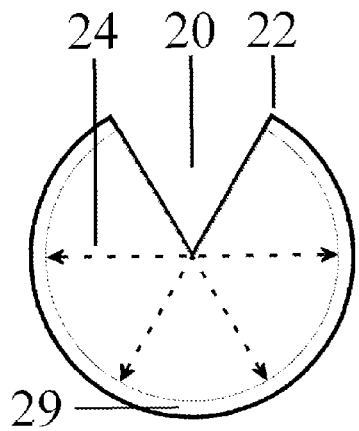
FIG. 1B illustrates a Round-shaped Number-6 Card Segment Layout.

Segment Layout—FIG. 1B

A segment layout 22 depicts five unpopulated one-sixth segments that together with populated segment 20 comprise one whole unit. Radial segment boundary markers 24 may delineate unpopulated segments.

FIG. 1B also shows an annular-shaped developer's information area 29. This is reserved for copyright, trademarks, patents, slogan, branding, sponsor information, or the like, as desired.

Figure 1C:
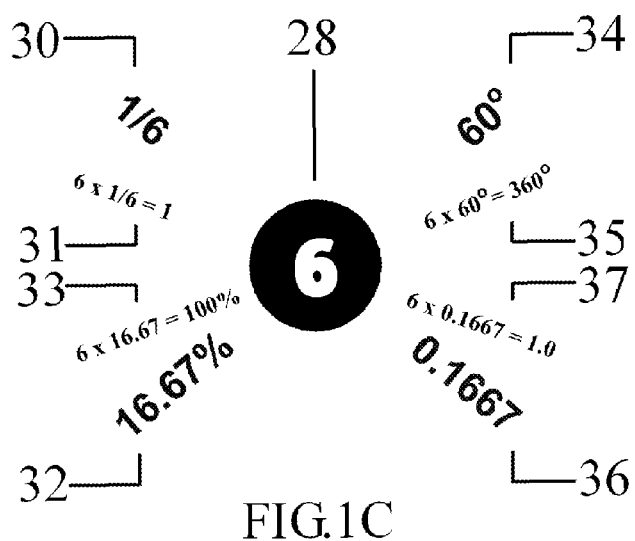
FIG. 1C illustrates a Round-shaped Number-6 Card Legend.

Legend—FIG. 1C

The card face has a plurality, preferably five, numerical interchangeable indicia denoting equivalent value. A card number 28 on the card, preferably at center, contains the numeral six. This identifies the card as a number-6 card. The numerical value of segment 20 is expressed in a plurality, preferably four, prevalent measurement systems. Players may use a measurement system of choice or switch between systems at will during play.

FIG. 1C shows the segment size expressed numerically as a fractional value 30 (⅙); as a percentage value 32 (16.67%); as a number of degrees of arc or degree value 34 (60°) and as a decimal value 36 (0.1667). These indicia are prominently displayed in a large legible color-coded font. They offer endless passive and active associative learning opportunities during play.

Informational indicia or educational hints may be paired with each measurement value. For example, fractional hint 31 (6×⅙=1) is paired with fractional value 30 showing that six one-sixth portions equal one whole unit. Similarly percentage hint 33 (6×16.67%=100%), -degree hint 35 (6×60°=360°) and decimal hint 37 (6×0.1667=1.0) elaborate percentage 32, -degree 34 and decimal value 36 respectively.

A different (e.g., smaller black colored) font is preferred for hints. Hints are used only on demand. They should not interfere visually with the normal information flows during play.

Card Tag—FIGS. 1D, 3, 3A, 4, 7A,11B

Figure 1D:
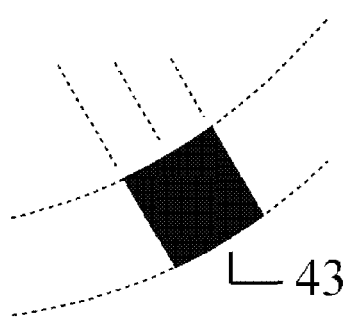
FIG. 1D illustrates a Almost-square Number-6 Card Tag Detail.

FIG. 1D shows an enlarged view of a sample number-6 card tag 43 for round-shaped cards. The dotted lines are for illustration only. Tag 43 designates a value of one-sixth share of one whole unit. A minimum of one tag 43 on the card face is required. FIG. 1 shows six tags 43 around the edge of the card face, one on each segment boundary 24. This symmetrical design reinforces card number 28.

Card tags are size-coded using a predetermined tag scale. Players may use tags coded with a linear tag scale to compare face values without understanding or even seeing other indicia. For example, players may correctly deduce that a number-6 portion is half the size of a number-3 portion (not shown). A simple ruler or custom measuring device may speed such comparisons, see FIG. 3

The peripheral location of card tags allows players to guard cards from prying eyes. Players may slide or fan open overlapping cards in hand to see any color-coded card tag (or suit marker) without exposure.

Players may also ascertain absolute card values when the tag scale is known. The tag scale divided by card number 28 sets the nominal tag dimensions for each number card. For example, FIG. 1D uses a 25.4 mm/1.0 in tag scale on a 76.2 mm/3.0 in diameter round card. Tag 43 measures 4.23 mm/one-sixth of one inch. Similarly a number-3 tag 40 (not shown) measures 8.47 mm/one-third of an inch on this tag scale.

Designers may select an appropriate tag scale and tag shape for their intended audience. As stated, preferably tags are color-coded to denote face value. Tags may be scaled in one or two dimensions.

In this round card example, tag 43 is scaled in two dimensions and has an almost-square shape. The outer and inner edges are curved with the same radius of curvature as the round card. The radial tag-height and distance between the outer and inner curved edges equals the tangential tag-width and distance between the two straight sides.

Each tag 43 straddles (is bisected by) a radius of the round card. The straight sides of tag 43 are parallel to and equidistant from the radius in question. The outer edge of each number-6 tag 43 is located on the circumference of the card face. The center point of the inside edge of tag 43 may be located on the perimeter of segment layout 22 if desired. Preferably scale the diameter of segment layout 22 accordingly.

Tag shape facilitates card alignment during meld value assessment. The outer edge of tag 43 on an overlapping card may be aligned exactly with the inner edge of any tag on an overlapped card, see FIG. 11B. Radial tag size on an overlapped card sets the radial offset between adjacent cards, see FIG. 7C. Almost-square tags and asymmetrical tags, see FIG. 3A, may also be aligned side by side using the straight tag edges. Here tag-width sets the offset between adjacent cards, see FIGS. 3 & 4.

Thus players may offset overlapping cards in a meld and align one tag from each card side by side to form a contiguous row of tags. The row size of adjacent tags in a group of correctly aligned cards is directly proportional to the group value, as determined by the tag scale.

When a contiguous row of tags measures one tag scale, then the group value is one whole unit (1/1, 100%, 360° and 1.00). So players with only limited math skills, but who can measure a row of tags, may meld cards to any value without knowledge of the other indicia or underlying math.

Figure 2:
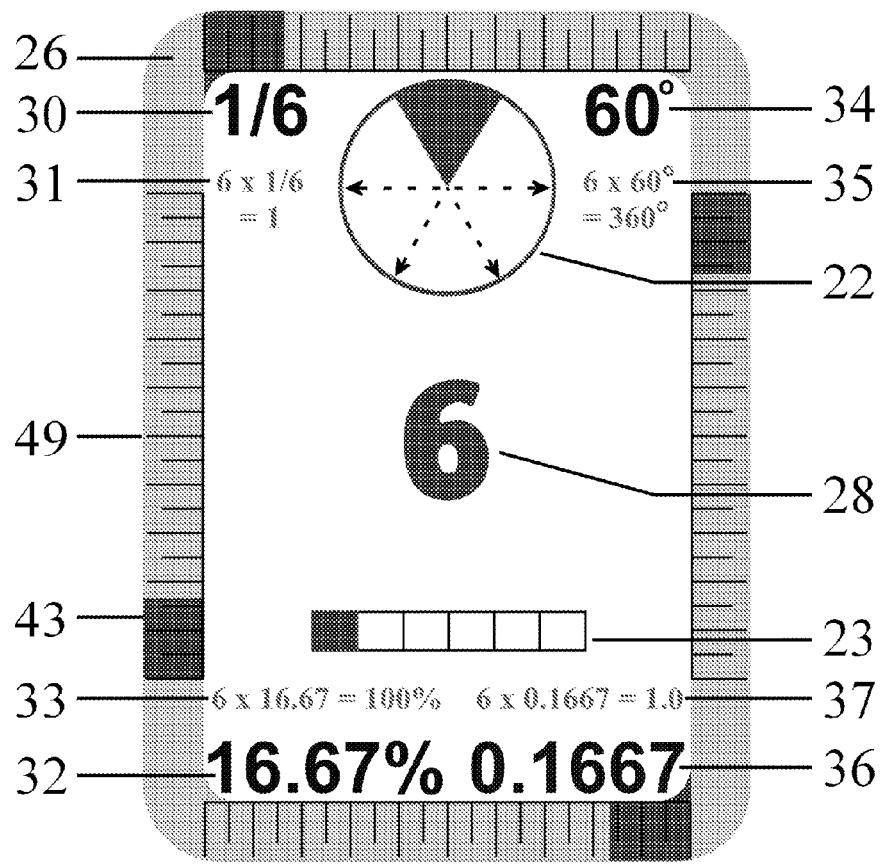
FIG. 2 illustrates a Face of a Rectangular Number-6 Card.

Rectangular Card Face—FIG. 2

FIG. 2 shows the face of a sample rectangular card. It has similar indicia to the round-shaped card above. Card number 28 at center is surrounded by fractional value 30 and hint 31, percentage value 32 and hint 33, degree value 34 and hint 35 and decimal value 36 and hint 37.

The number-6 card in FIG. 2 capitalizes on its rectangular shape, preferably as follows:

two informational indicia, segment layout 22 and segment bar chart 23, depict portion size in relation to whole unit size in easy to understand and use chart formats (pictographs);

segment layout 22 is grouped with fractional value 30 and degree value 34 at top;

segment bar chart 23, percentage value 32 and decimal value 36 are grouped at bottom;

a first tag edge of tag 43 aligns with the origin of integrated measure 49; a second tag edge registers face value on integrated measure 49; preferably all rectangular card faces have four such integrated measures 49;

tags are scaled in one dimension only along a card edge; a 50.8 mm/2.0 in tag scale allows a 6 mm/0.25 in wide suit marker 26 on poker-sized cards; smaller tag scales allow wider suit markers 26.

Figure 2A:
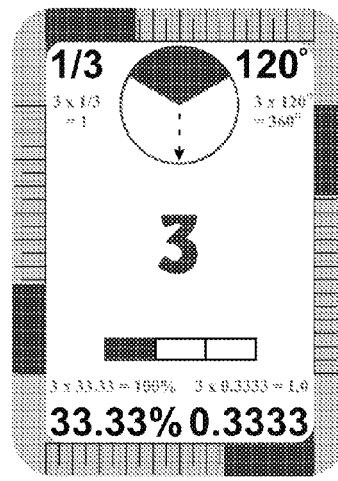
FIG. 2A illustrates a Face of a Rectangular Number-3 Card.
Figure 2B:
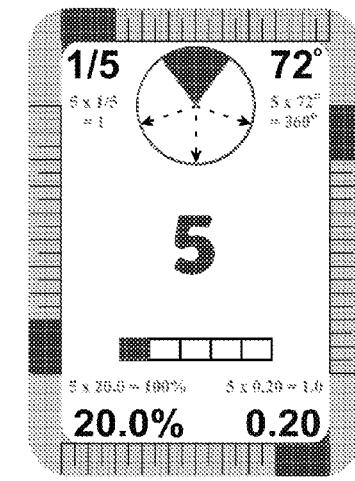
FIG. 2B illustrates a Face of a Rectangular Number-5 Card.
Figure 2C:
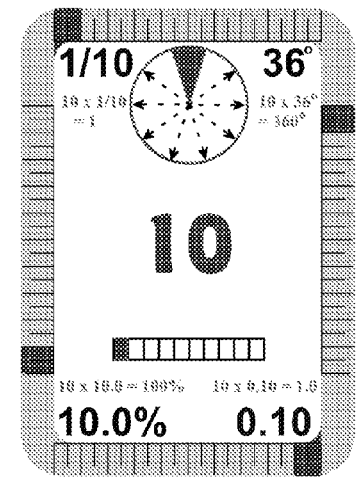
FIG. 2C illustrates a Face of a Rectangular Number-10 Card.

FIGS. 2A, 2B and 2C depict sample number-3, -5 and number-10 rectangular card faces.

Group Value

As stated the total size of a row of contiguous tags, one from each card in a group of correctly aligned cards, is directly proportional to the total face value of the group, as defined by the tag scale:

when the tag scale is known, players may measure total tag row size with a linear measuring device, such as a ruler, and convert this distance into a group value by hand or calculator; however this method is tedious, prone to error and slow;

alternatively a measure may be calibrated to convert tag row size directly into a group value in any prevalent measurement system and without recourse to math; the tag scale need not be declared even;

players may use an integrated measure on any card; if so a separate ruler or measure is unnecessary;

integrated measures on rectangular card edges are straight; they are easy to access and use;

integrated tags and measures on round card edges or inside card faces may be more problematical in some instances.

Game designers may choose a tag shape, scale and measure appropriate to card shape and application.

Measures

Actual measure design depends upon the individual application. The illustrations include some examples of straight and curved measures, double measures and composite curved measures as follows:

FIG. 2 shows integrated measure 49

Figure 3:
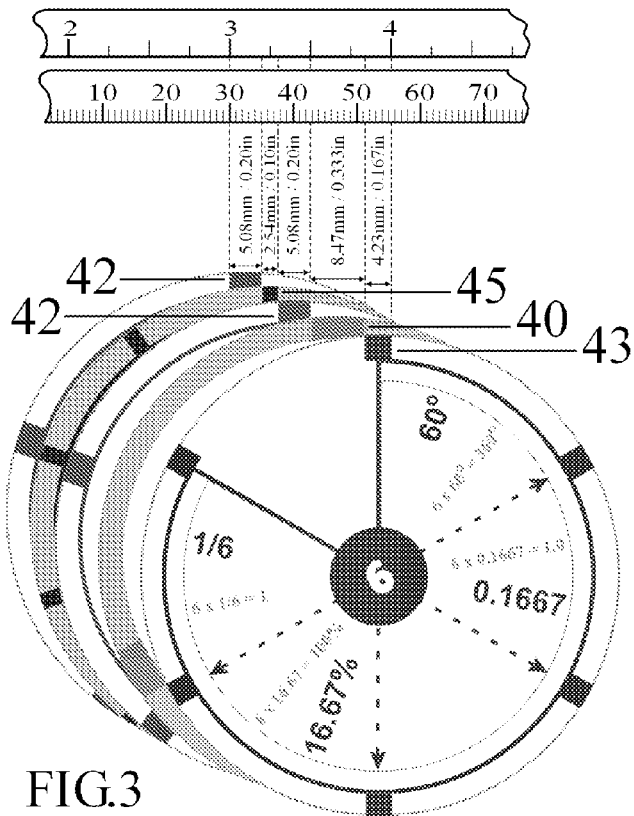
FIG. 3 illustrates a Meld of Round-shaped Cards.
Figure 3A:
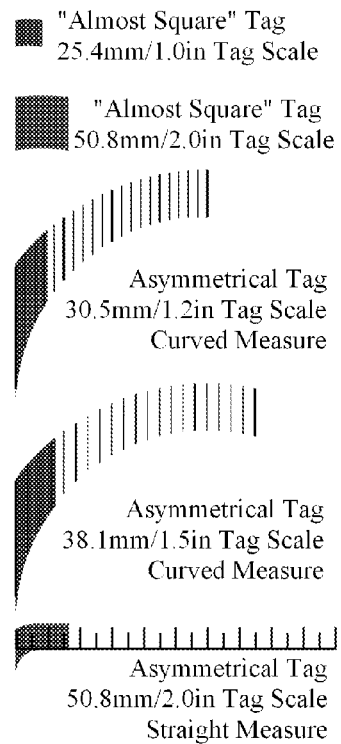
FIG. 3A illustrates a Tag Detail.

FIG. 3A illustrates straight and curved measures

FIGS. 3B, 5A, 6, 7A, 9C, 10A, 13A, 14A and 15 show different applications of percentage measure 66, fraction 67, decimal 68 and degree measure 69

Figure 3B:
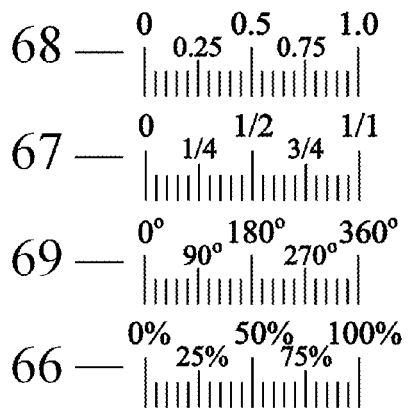
FIG. 3B illustrates a Measure.
Figure 3C:
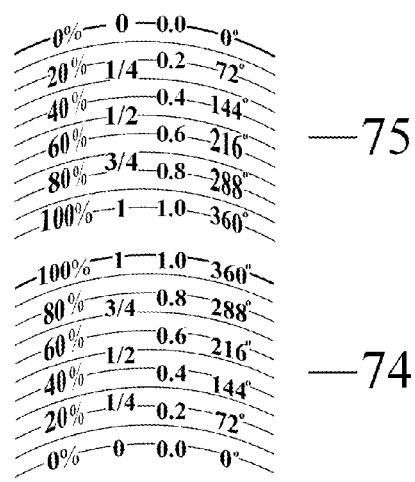
FIG. 3C illustrates a Composite Curved Measure.
Figure 13A:
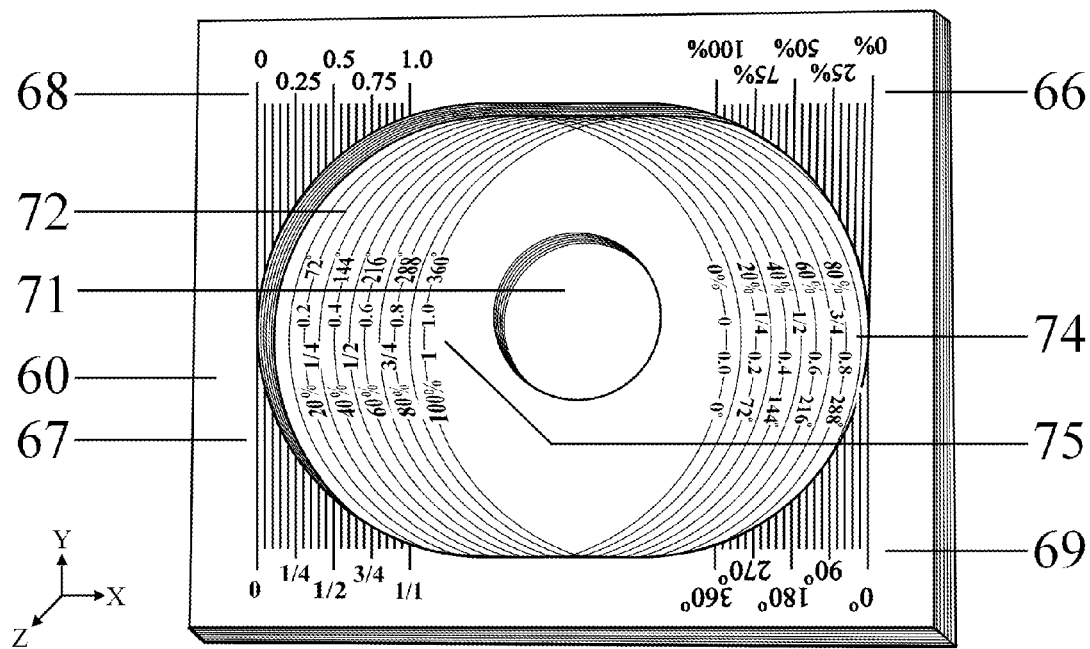
FIG. 13A illustrates a Slot Measure.
Figure 15:
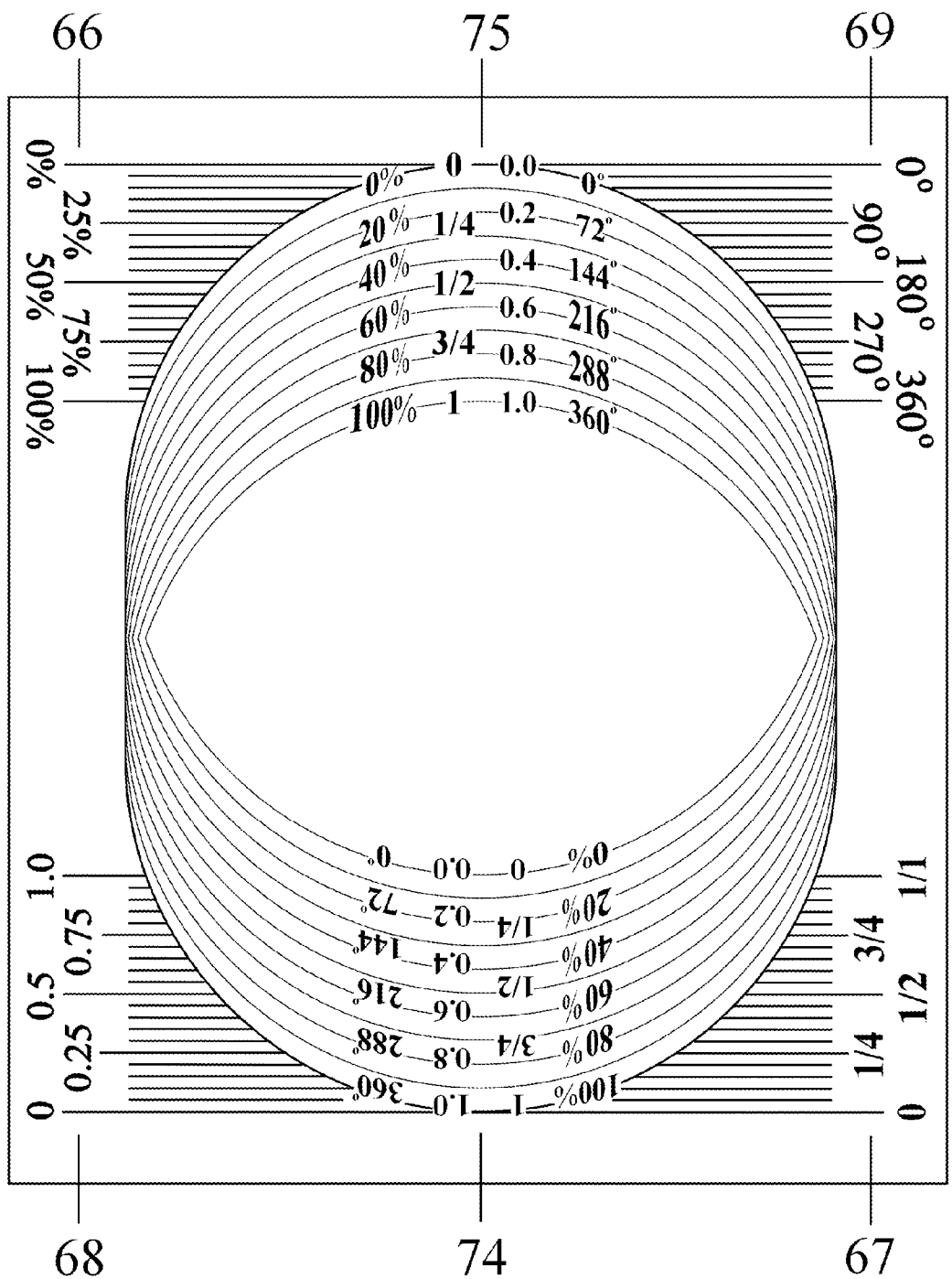
FIG. 15 illustrates a Template Measure.

FIGS. 3C, 13A, 15 show composite curved measures 74 and 75

Figure 12A:
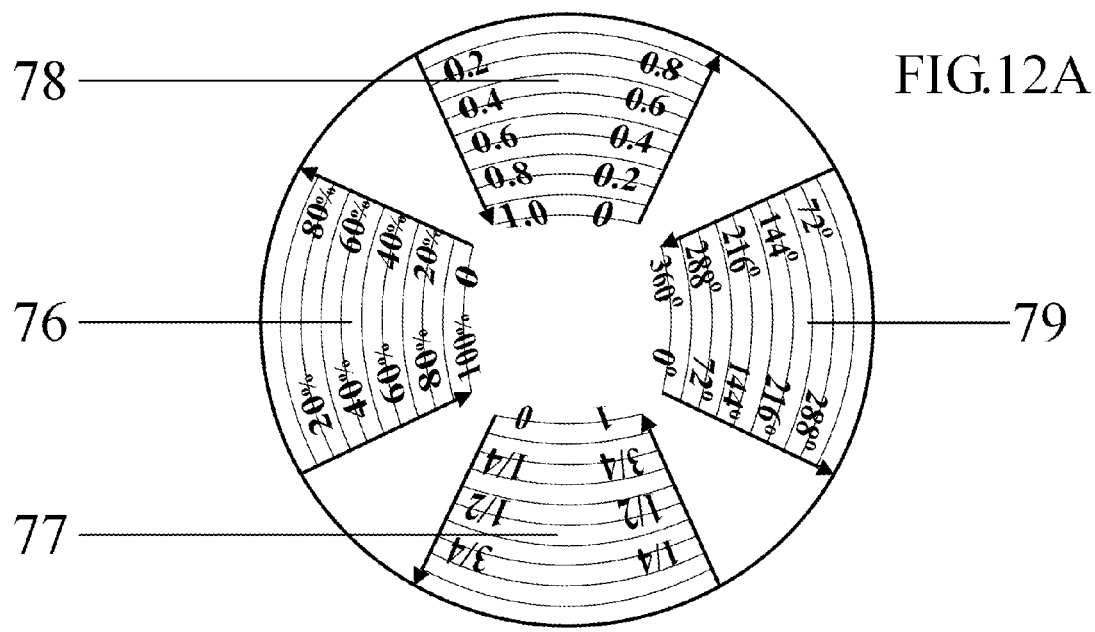
FIG. 12A illustrates a Transparent Template Measure—Round Cards.

FIG. 12A illustrates measures 76, 77, 78 and 79

As stated measures may be scaled according to a linear scale or a logarithmic scale. FIG. 18C shows a measure with logarithmic graduations.

Rectangular and Round-Shaped Card Backs

The card back design is not abstract. Informational indicia and segment charts show relationships between card number 28 and fractional value 30; and between different sized segments. The object is to provide instant game hints and suggest winning solutions using colors and cookie-cutter patterns.

Figure 5A:
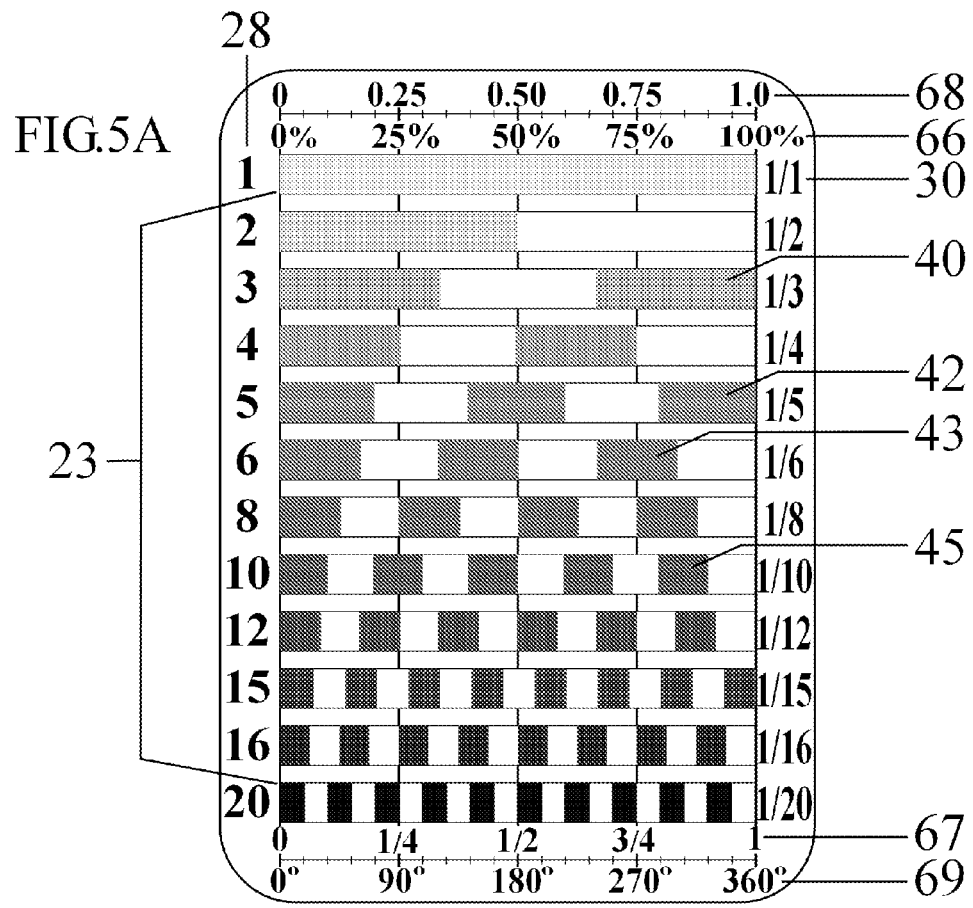
FIG. 5A illustrates a Rectangular Card Back—$1^{st}$ Alternative.

Rectangular Card Back—FIG. 5A

All rectangular card backs are preferably segment charts and measures also. Players may align a row of tags with any data row or measure on any card back to measure a group size. A sample rectangular card back in FIG. 5A uses the same 50.8 mm/2.0 in tag scale and color-coding scheme as the card face.

It comprises in a preferred embodiment:

several (12 are shown) segment data rows; segment sizes denote relative and absolute values; each data row starts with a card number 28 (row number, divisor) at left (these may or may not be consecutive); a fraction or segment bar chart 23 occupies the center column (same tag scale as tags and measure 49 on the card face); a fractional value 30 (the reciprocal of card number) ends each row;

each segment bar chart 23 contains one whole unit divided into an appropriate number of color-coded equal sized segments as defined by card number 28 (divisor);

each colored segment is the same size and color as a tag on the face of a corresponding number card; so segments in row/card numbers 3, 5, 6 and 10 match card tags 40, 42, 43 and 45 respectively;

two integrated measures 68 and 66 at top, and two integrated measures 67 and 69 at bottom, use a 50.8 mm/2.0 in tag scale and align horizontally with segment bar charts 23.

The card back reveals that two number-5 tags 42 and one number-10 tag 45 equal 50% of a whole unit. A number-6 tag 43 and a number-3 tag 40 total 50% also. So these two groups are equal and total one whole unit together. Thus players may find inspiration and identify winning strategies during play.

Figure 5B:
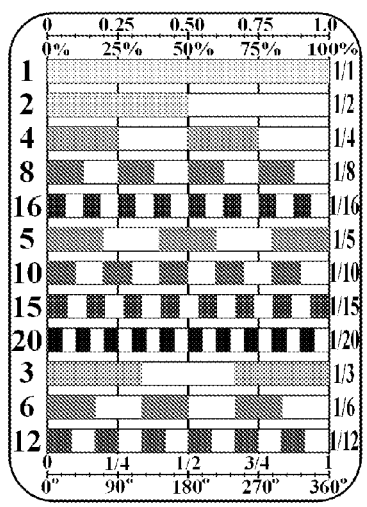
FIG. 5B illustrates a Rectangular Card Back—$2^{nd}$ Alternative.

FIG. 5B has the same data as FIG. 5A but in a different sequence. The data rows are grouped into radix-2, radix-5 and radix-3 number groups to speed segment comparisons and conversions.

Figure 5C:
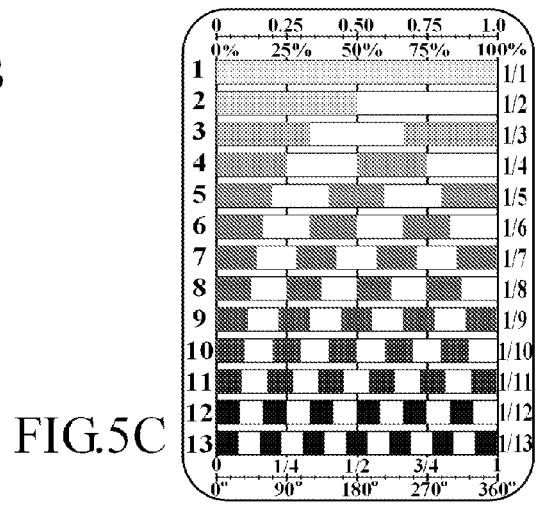
FIG. 5C illustrates a Rectangular Card Back—$3^{rd}$ Alternative.

FIG. 5C shows a card set with ranks 1 through 13 suitable for both popular and math card games. Players may learn to associate card number 28 and portion sizes semi-automatically in play.

Round card backs are similar. However absolute segment length is somewhat arbitrary.

Figure 6:
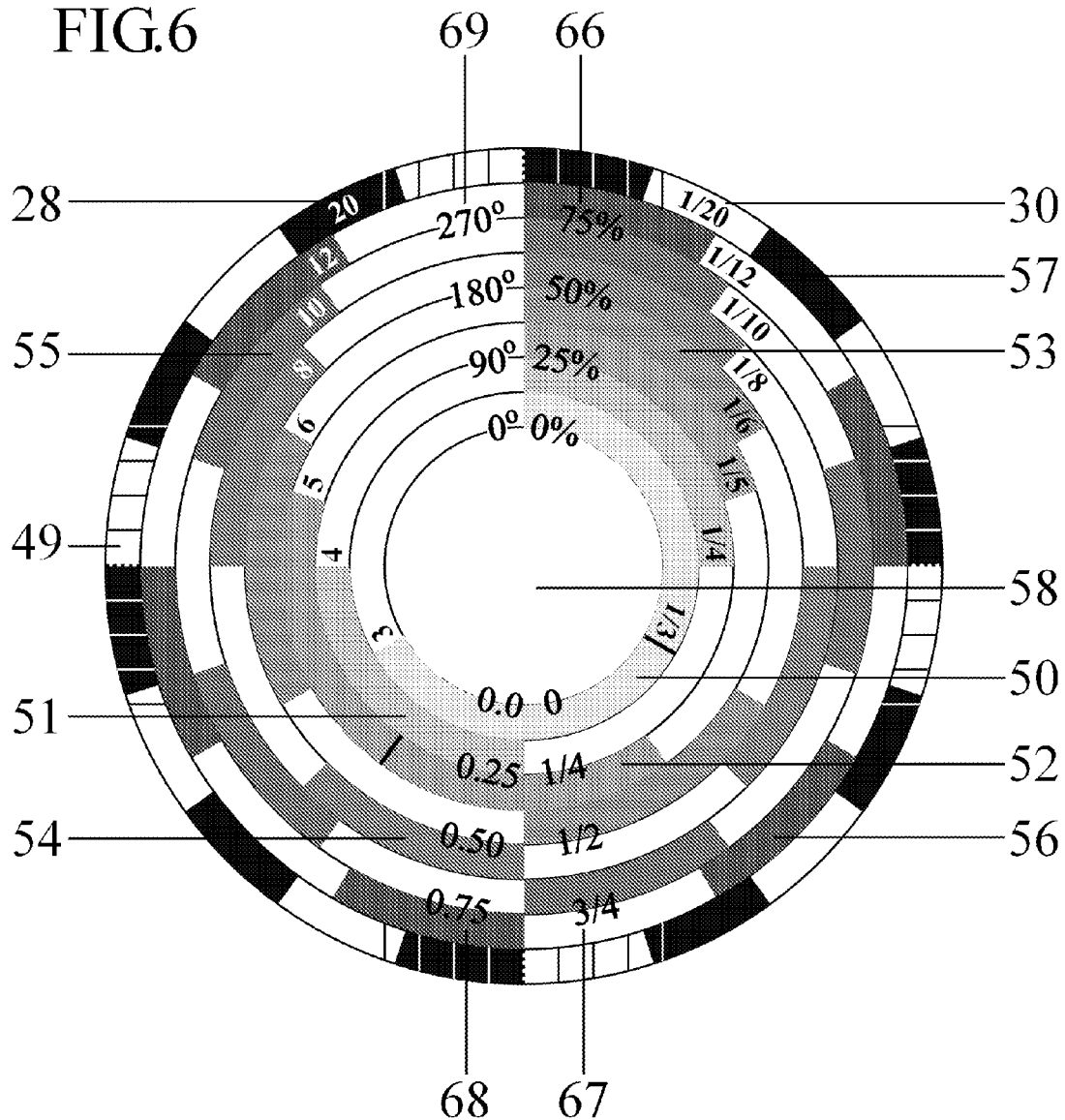
FIG. 6 illustrates a Round Card Back.

Round Card Back—FIG. 6

The round playing card back has the same basic features as a rectangular card back. It may also include informational indicia. Color-coded concentric segment rings surround a central publicity area 58 reserved for branding, logo, etc. Radial angle, not segment length, denotes value. Round card backs and faces may share the same color-coding scheme. Integrated measures 49 use the same tag scale as the card face.

The radial width of each ring shown is 3.175 mm/0.125 in on a 76.2 mm/3 in card. Together the eight rings measure 25.4 mm wide or one tag scale. Each segment ring is divided into a set of equal sized segments as defined by card number 28. Again segment length does not equal tag size. Instead segment length equals ring circumference (varies based on its position in the radial sequence) divided by card number 28.

Players may find winning strategies by studying segment relationships. For example, FIG. 6 shows #3 ring 50, #6 ring 53 and #12 ring 56 divided respectively into three, six and 12 equal-sized segments. It is evident that four one-twelfths equal two one-sixths or one one-third. Multicolored drawings speed comprehension.

Radix-2 and radix-5 segment relationships are also evident. For example, two quarters on #4 ring 51 equal four one-eighths on #8 ring 54; these in turn equal two one-fifths on #5 ring 52 plus one one-tenth segment on #10 ring 55. Similarly one one-tenth on #10 ring 55 equals two one-twentieths on #20 ring 57, etc.

Four radial and four tangential integrated measures convert a row of contiguous tags directly into a group value. The edges of the eight segment rings graduate four radial measures 66, 67, 68 and 69 in 3.2 mm or 0.125 in increments. Developers may calibrate the four tangential measures 49 as desired.

Separate Measures

Separate measures may be designed for hand-held or table-top use and for round-shaped or rectangular-shaped cards. They help players organize cards, align tags and measure a row of correctly aligned tags. They may include informational indicia about equivalent and comparative values and game strategies also.

Figures 7A, 7B:
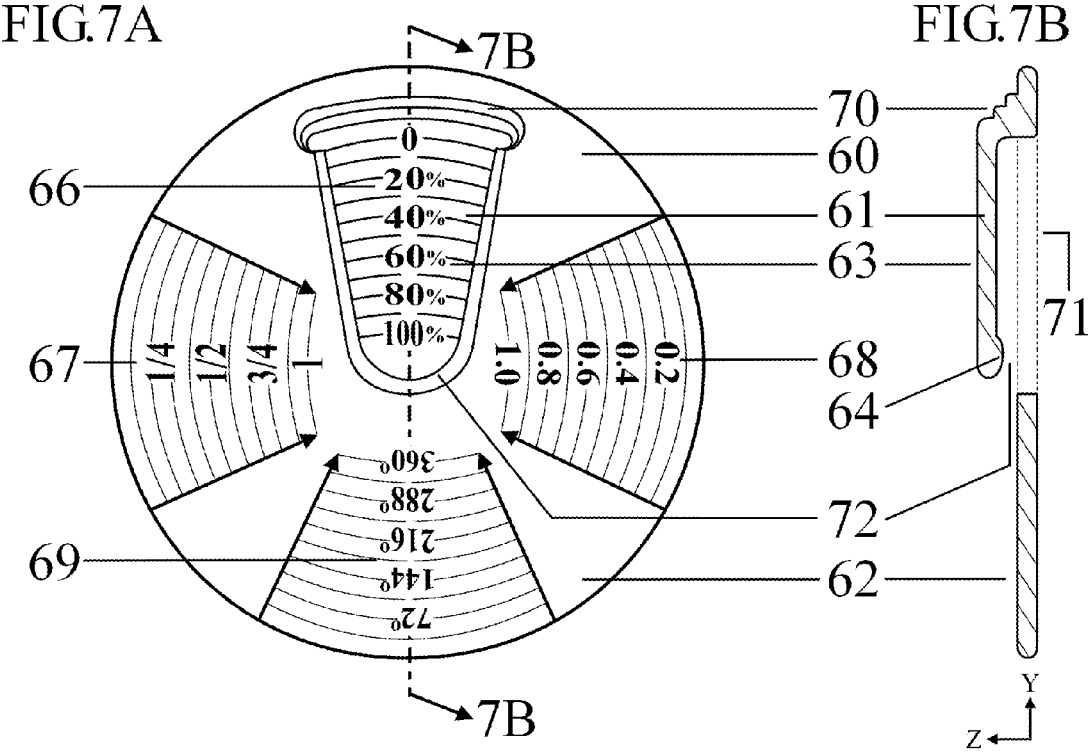
FIG. 7A illustrates a Hand-held Clip Measure—Plan View.
FIG. 7B illustrates a Hand-held Clip Measure—Cross Section.

Hand-held Measure with Card Clip—Round-Shaped Cards, FIGS. 7A & B

A hand-held measure with card clip or clip measure is a simple tool small enough to fit comfortably in one hand. It has two main functions. It helps players organize hold, align and meld cards in hand. It measures a row of correctly aligned tags and converts tag row size directly into a total group value.

A clip measure is a compound lever comprising a calibrated clip and card platform joined at a fulcrum by a hinge to form a card slot between the clip and the card platform. A clip measure may be manufactured in one piece using an injection molding process, or the like. Clear acrylic or polycarbonate customarily used for rulers and drafting tools may be used.

FIG. 7A shows a plan view in the xy-plane of a sample clip measure. FIG. 7B shows a yz cross-section.

A body 60 is preferably the shape and size of a round playing card. A card platform 62 supports cards during melding and measurement. A card slot 72 is located between platform 62 and a card clip 61. Slot 72 capacity depends upon card set and game objectives. A hinge 70 attaches clip 61 to body 60 and allows limited movement of clip 61 back and forth in a direction perpendicular to platform 62.

Clip 61 has a card clamp 64 on its free end and facing inwards. Preferably clamp 64 aligns with the center of body 60. A grip 63 is located on the outer surface of clip 61. Light thumb pressure on grip 63 moves clip 61 with clamp 64 towards cards resting on platform 62 gradually closing hinge 70 and slot 72. Thus cards inside slot 72 are held secure between clamp 64 and platform 62.

Body 60 and/or clip 61 may be calibrated appropriately. Measure 66 converts tag row size into percentage value directly. Body 60 has fraction decimal and degree measures 67, 68 and 69 for meld measurement without clip 61. Measures may be molded into body 60 and clip 61 during injection molding or the like. This may eliminate costly measure calibration, inscription or printing after molding.

Preferably clip 61 and platform 62 interleave to reduce product costs. Players may manipulate cards inside slot 72 through a finger hole 71 in platform 62. Cards inside slot 72 form a bridge between clamp 64 and platform 62. Equal and opposing forces on adjacent edges of platform 62 and clamp 64 hold cards secure. Clip 61 may be extended to increase leverage and grip by moving clamp 64 beyond the center of body 60.

Figure 9A:
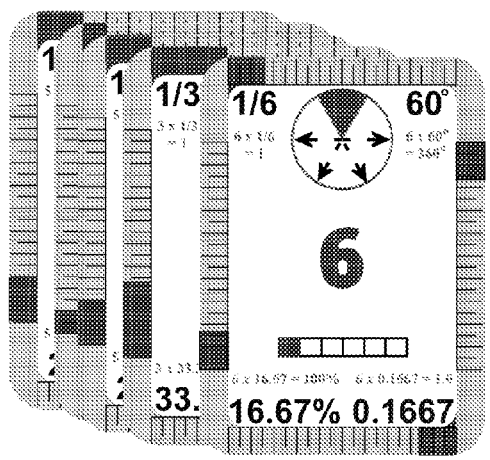
FIG. 9A illustrates a Meld of Aligned Rectangular Cards.
Figure 9B:
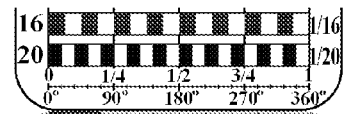
FIG. 9B illustrates a Using an Integrated Measure—Rectangular Cards.
Figure 9B:
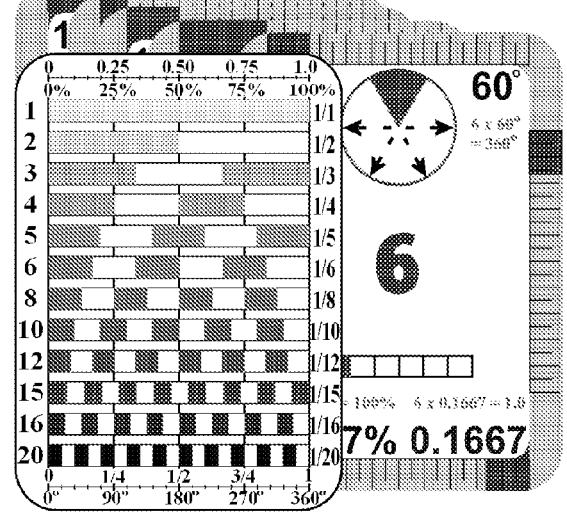
Figure 9C:
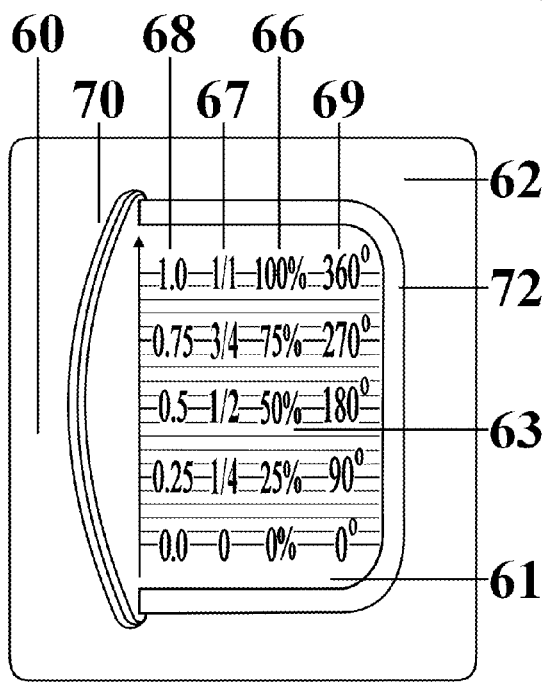
FIG. 9C illustrates a Hand-held Clip Measure—Rectangular Cards.

Hand-held Clip Measure—Rectangular Cards, FIG. 9C

FIG. 9C shows a similar clip measure intended for rectangular cards. Hinge 70 attaches clip 61 to body 60. Slot 72 holds aligned cards secure between transparent clip 61 and platform 62. A contiguous row of aligned tags inside slot 72 is visible through clip 61. Clip 61 is calibrated with measures 68, 67, 66 and 69 drawn using a 50.8 mm/2.0 in tag scale. Preferably the scale zero aligns with start of a $1^{st}$ card tag, see later.

Thus players may read group value directly in a prevalent measurement system.

OPERATION

Preferred Embodiment

A preferred embodiment uses rectangular cards, see FIGS. 2, A-C. There are four 13-card suits.

Each suit has the same set of radix-3, -4 and radix-5 number cards comprising two one-third, two one-quarter, two one-fifth, two one-sixth, three one-twelfth and two one-twentieth cards.

The overall (this preferred deck does not contain all number cards) color-coding scheme is:
   red primary for radix-3: number-3, -6 and -12 are colored red, pink and brown respectively;
   blue primary for radix-4: number-4 and -8 cards are colored bright blue and dark blue respectively;
   green primary for radix-5: number-5, -10 and -20 cards are colored bright-, dark- and light green.

A typical math game objective is to be the first player to meld one whole unit from cards of the same suit. This deck offers 1,012 (253 per suit) unique ways or combinations to make one whole unit using seven or fewer cards. Two jokers add another 5,576 unique combinations making a total of 6,588 winning hands.

Here is how a game might be played based upon the popular card game of Rummy.

The Deal:
   deal and play are clockwise; the turn to deal passes to the left after each hand;
   dealer shuffles and the player at his or her right cuts the deck before the deal;
   dealer deals six cards, one at a time, face down to each player in clockwise rotation;
   stack the remaining cards face down on the playing surface to form a stock;
   turn over the top card, place it face-up next to the stock to start a discard pile.

After the deal, players sort and group their cards into suits ready for play. Preferably players conceal their hand at all times and use only card edges to review overlapped cards.

The Play
   The player seated to the left of the dealer begins by drawing one card either the top card of the discard pile on view if desired or the top card of the stock. The player completes his or her turn by discarding one unwanted card face up on top of the discard pile. Players may not draw the top card of the discard pile and discard it in the same turn.
   In turn the next player seated to the left draws a card and discards one card. When the last card of the stock has been drawn, the next player may either select the top of the discard pile or draw the top card of the new stock, after turning the discard pile over without shuffling to form a new stock.

A Winning Hand—FIG. 9A
   Depending upon the game, a winning hand contains at least one whole unit using four, five or six (or seven with the discard) cards of the same suit or Jokers. Typically a joker may duplicate any other card within a meld. Preferably joker value is agreed in advance.
   A player may only declare a winning hand during his or her turn. After drawing from either the discard pile or stock as usual, the winner should lay down a winning meld face up on the table for review by the other players. The winner may make a final discard(s) to end the game or meld all seven cards without discard.
   FIG. 9A shows the same sample meld of five rectangular cards with a group value of one whole unit. From back there is a number-5, -10, -5, -3 card and a number-6 card at front. The end of the number-6 card tag at front registers a group value of one unit on the integrated measure on the $1^{st}$ number-5 card at back.

Figure 17:
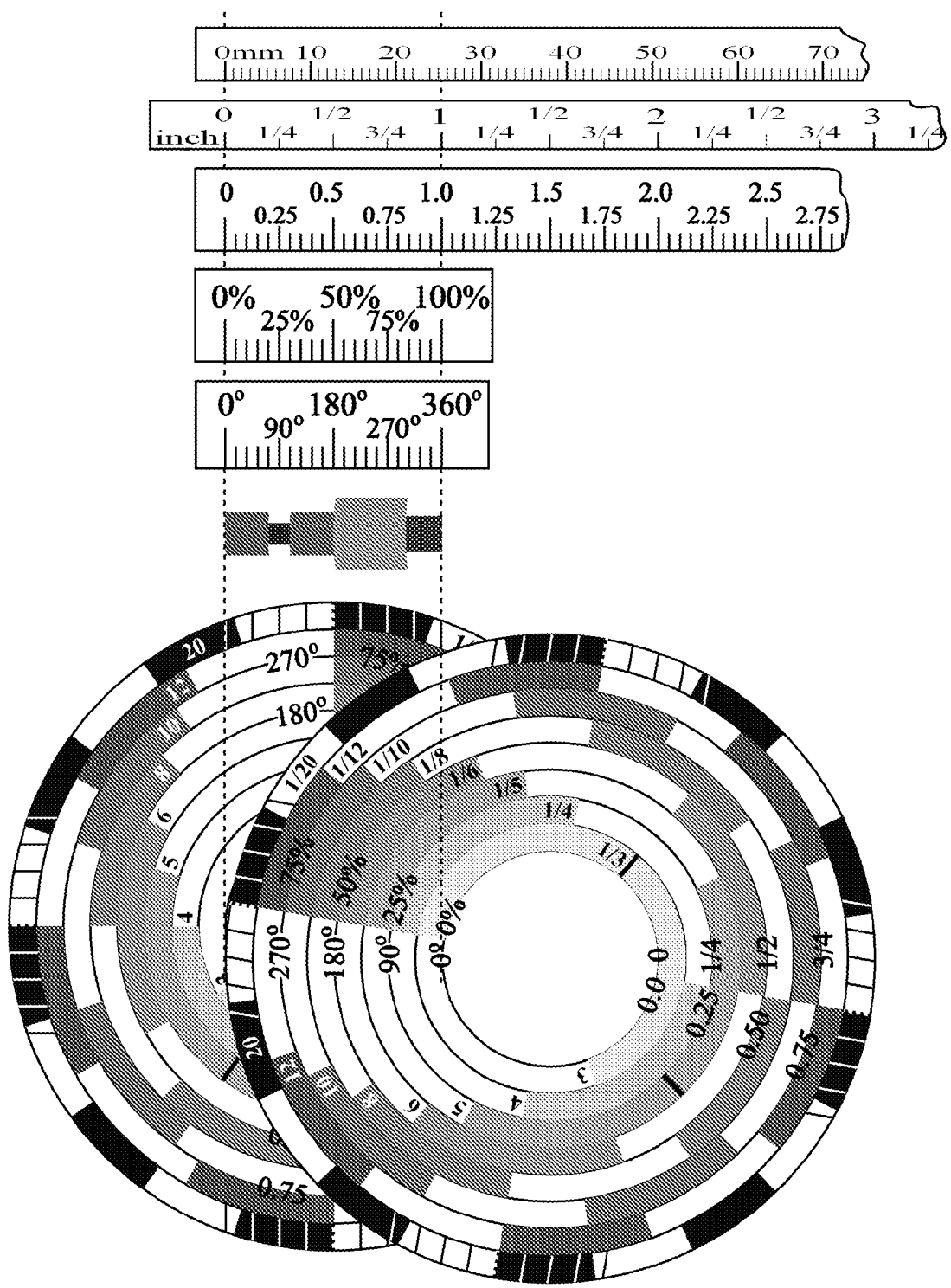
FIG. 17 illustrates a Using a Card Back Measure & Custom Rulers—Round Cards.

Using a Card Back Measure to Measure a Row of Contiguous Tags—FIGS. 9B & 17
   Players may use an integrated measure on any rectangular card back to measure group value, see FIG. 9B. This meld measures 1/1 or 360° at bottom, and 1.0 or 100% at top. A meld of round cards may be measured with an integrated measure in like manner, see FIG. 17. For clarity only the tags are shown. The tag group measures one whole unit on a tangential measure, or 360° on a radial measure, on the round card back.

Using a Clip Measure—Rectangular Cards, FIGS. 9C & D
   Hold body 60 in the palm of one hand. Align thumb on grip 63. Use other hand to slide a $1^{st}$ card inside slot 72. Align bottom edges of $1^{st}$ card and clip measure to automatically align $1^{st}$ tag with the measure zero.

Feed remaining cards into slot 72 one at a time. Slide each successive card under clip 61 and offset it from its predecessor to give good tag visibility. Align bottom edge of each successor tag with top edge of its predecessor. Alternately release and clench grip 63 to adjust or secure meld alignment. As desired insert finger(s) through hole in platform 62 to grip or adjust card backs inside slot 72.

Figure 9D:
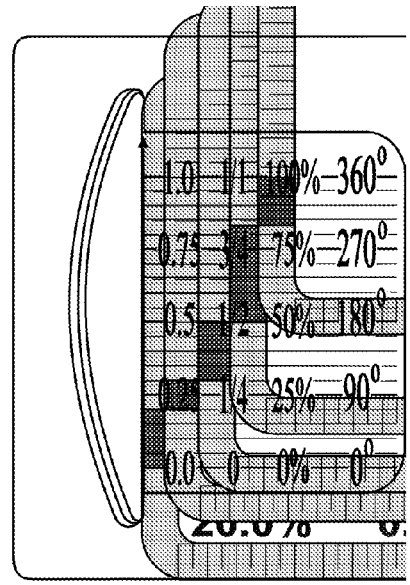
FIG. 9D illustrates a Using a Hand-held Clip Measure—Rectangular Cards.

FIG. 9D shows a correctly aligned meld inside the clip measure. Simplified card faces improve legibility. Read the group value directly on any one of four measures on clip 61 (1/1, 100%, 1.00 or 360°).

Figure 7C:
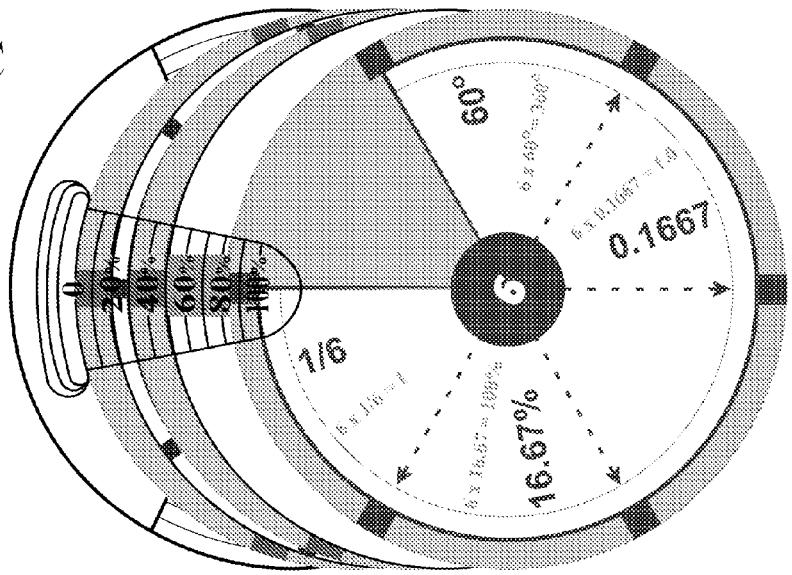
FIG. 7C illustrates a Using a Hand-held Clip Measure.

Using a Clip Measure—Round Cards, FIG. 7C

Load a clip measure for round cards in like manner. FIG. 7C shows the correct alignment for round cards with almost-square tags. The group value is 100%.

Subtraction

Align the ends of two tags (not the start of one tag with the end of a predecessor tag as for addition):

- select $1^{st}$ card with the larger face value and tag size;
- place $2^{nd}$ card with the smaller face value and tag size over $1^{st}$ card;
- offset $2^{nd}$ card so $1^{st}$ card tag is visible;
- align the ends of the two selected tags together, one from each card;
- the start of the smaller tag registers their difference on the $1^{st}$ card measure;
- if necessary, compute the sign mentally.

Subtraction works for card groups also. Overlay one group of aligned cards and tags on top of a second larger group of aligned cards and tags. Read group difference on the integrated measure on the bottom card.

Note: Transparent card stock may be suitable for subtraction in a non-competitive learning environment.

Thus a group value in a prevalent measurement system may be found directly just by aligning and measuring a contiguous row of tags, one from each card. Players need not use or even see the other indicia. Any player may obtain a group value without using or understanding the underlying math.

Players may start with images and graduate to symbols and numbers at their own pace. Gradually through play, players learn to associate specific numerical values with specific pictures. With practice players start to comprehend equivalencies and should in time become skilled at converting between and determining a group value in all four measurement systems.

Associative Learning

Players learn differently and at their own pace. Passive association starts gradually in play and is semi-automatic. Familiarity breeds confidence that leads to understanding and perhaps eventually to proficiency.

Some players may use measurement systems interchangeably. A player may start with the decimal system. However during play she will be continually exposed to and become familiar with equivalent values in other prevalent measurement systems and to equivalent image and graphic representations also.

Association need not be passive. A particular game may be played in decimals, another in fractions, etc. Say-the-name games help players learn to associate sounds with symbols. There are almost endless opportunities for fun and associative learning limited only by the imagination and abilities of players.

Novices may play with number cards even if they know nothing about fractions decimals percentages or degrees. For example novices may:

- play variations of matching card games usually played with a standard deck;
- order and rank cards visually by segment size or tag size;
- associate colors with segment and tag sizes, and with numbers and symbol sets.

And the best part is that learning occurs semi-automatically while having fun playing cards.

DESCRIPTION

Additional Embodiments

The subject invention is a game system. Actual games depend upon intended audience and use. Game developers may vary the range, size and number of cards and suits. They may offer generic card sets for multiple games. They may provide custom card sets for specific games and niche markets, for example radix-10 only. They may also offer game accoutrements such as game boards, dice and spinners.

Card Deck Variants

The card deck in a preferred embodiment above offers a variety of math games for learners, intermediate and advanced players. However, the one-twentieth card and even the one-twelfth card may be unsuitable for younger audiences.

Also the addition of a one-half and one-tenth card, even a one-unit card, could greatly simplify learning and speed play, especially for beginners.

The range illustrated in FIG. 5C matches a standard 52-card deck. It offers all existing playing card games and fraction decimal percentage and degree learning also. This deck has four suits of 13 individual number cards in ranking (portion size) order: one whole unit (1/1), one-half, one-third, one-quarter, one-fifth, one-sixth, one-seventh, one-eighth, one-ninth, one-tenth, one-eleventh, one-twelfth and one-thirteenth of a unit.

Novices may use this deck with regular ♣ ♦ ♥ ♠ suits to play only existing card games at first. Unintended and involuntary associative math learning could begin automatically.

A game set may contain several different decks sharing a common back design, for example one deck each of radix-3 cards, radix-4 cards and radix-5 cards. This would allow individual radix-based games or mix'n match games as desired. As stated, number cards need not be limited to a single portion. Multiple portions such as three one-fifth's may be accommodated easily. Also tag shape and size may vary.

Tag Shape and Size Variations

Curved edges on round cards complicate tags and meld value measurement. Tags on overlapped round cards are easily obscured. A round shape limits the maximum tag scale to say 38 mm/1.5 in on a 76 mm/3.0 in diameter card; compare to 51 mm/2.0 in even to 76 mm/3.0 in on a rectangular card.

FIG. 3 shows the sample meld of round cards using almost-square tags and a 25.4 mm/1.0 in tag scale. Tags 42, 45, 42, 40 and tag 43 measure 5.1 mm, 2.5 mm, 5.1 mm, 8.5 mm, 4.2 mm/one-fifth, one-tenth, one-fifth one-third and one-sixth of an inch respectively in radial height and tangential width. This group of tags measures 25.4 mm/1.0 in; the group value is one whole unit (1/1, 100%, 360° or 1.00).

FIG. 2 shows a rectangular-shaped tag 43. FIG. 3A shows some alternative tag shapes with or without integrated measures. The juxtaposition of tag and measure gives immediate face-value context and speeds user understanding. Also as stated players may align a row of tags, one from each card, and measure aggregate value on an integrated measure.

FIG. 3B shows decimal, fractional degree and percentage measures 68, 67, 69 and 66. Instant readout avoids tedious or challenging conversion math; it speeds play and enhances fun and learning too.

FIG. 3C shows composite curved measures 74 and 75. These show progress towards, and required value to complete one whole unit in four different measurement systems.

Round-shaped Cards with Asymmetric-Shaped Card tags—FIG. 4

FIG. 4 shows asymmetric-shaped tags scaled using a 30.48 mm/1.2 in integrated measure 49 on a 76 mm/3 in diameter card. (Note: here tag scale equals radius of segment layout 22, see FIG. 1B). These give good overlapped card tag and measure visibility for right-handed players working left to right. A y-axis mirror image, located top right of the card face, could service left-handed players working from right to left.

FIG. 4A shows an expanded view of asymmetric tags 42, 45, 40 and 43 with integrated measure 49 on the number-5, -10, -3 and number-6 cards in the group.

FIGS. 4B, C & D show the faces of sample number-3, -5 and -10 card faces respectively.

Figure 16:
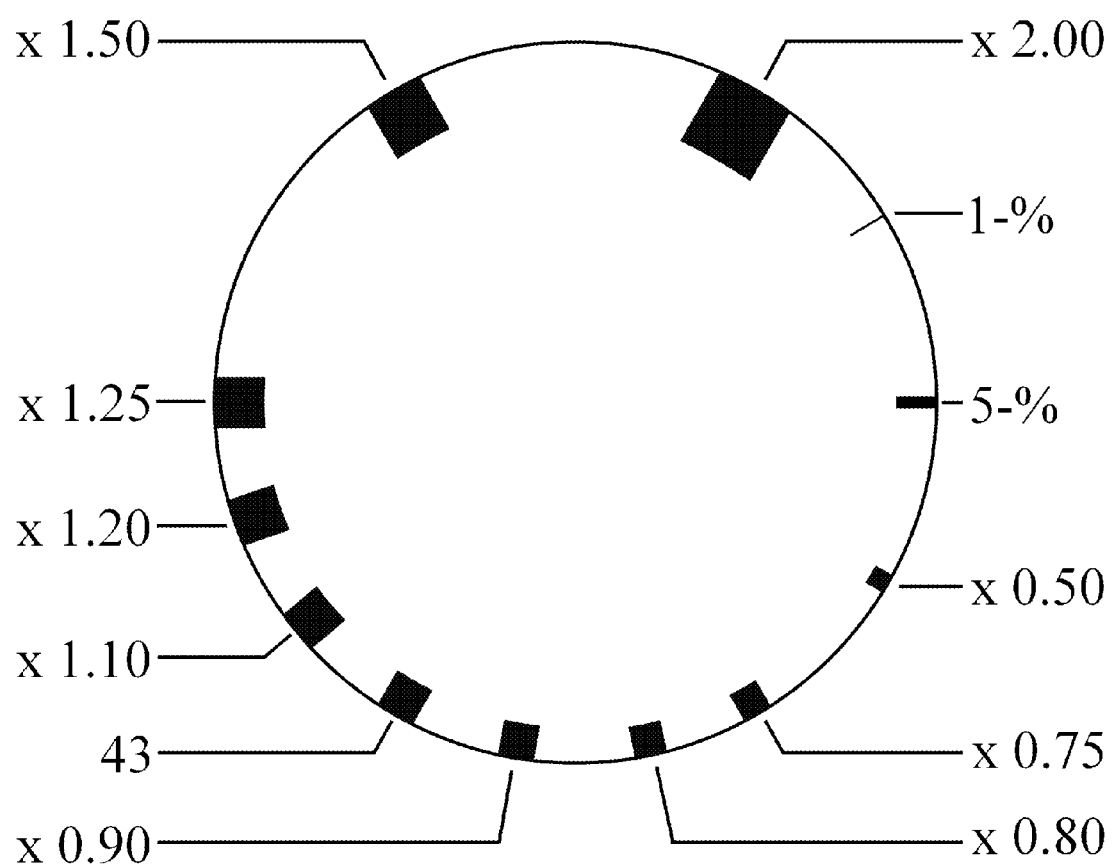
FIG. 16 illustrates a set of Factored Tags.

Tag Value Variants—FIG. 16

In a preferred embodiment each number card has an invariant face value and a multiple number of color- and size-coded tags. However, tag alignment and meld value measurement require just one tag per card. Furthermore invariant face values may be unnecessarily restrictive for some advanced applications.

FIG. 16 shows a number-6 card with just one almost-square tag 43 designating a nominal face value of ⅙, etc. Using tag 43 size as a base, other tag sizes are factored up or down as labeled to designate premium or discounted face values. Note: game designers may label factored tags or publish a coding scheme.

Factored tags may be suitable for time-based applications such as life or money games. Any factor may be applied depending upon the intended audience and application. FIG. 16 shows four tags factored down in size to 0.50, 0.75, 0.80 and 0.90 of a regular tag 43. These represent 50%, 25%, 20% and 10% discounted face values respectively. Similarly, five tags are factored up in size to 1.10, 1.20, 1.25, 1.50 and 2.00 of a regular tag 43 and represent 10%, 20%, 25%, 50% and 100% premium face values respectively.

Almost-square tags may be impractical for small segment sizes. So for small segments, preferably:
 standardize radial tag-height independent of face value;
 scale tangential tag-width only;
 fix the radius of segment layout 22 FIG. 1B (e.g., equal to card radius less radial tag-height).

FIG. 16 shows 5-% and 1-% tags scaled in width only with the same radial tag-height as a regular tag 43.

Multiplication and Division—Logarithmic Tags

Multiplication and division is possible by simple tag alignment also using tags and measures scaled on a logarithmic scale. Since log(x)+log(y)=log(xy), the sum of two logarithmic tags equals the log of their product. Similarly log(x)−log(y)=log(x/y) and the difference between the log of a dividend tag and the log of a divisor tag is the log of their quotient.

Preferably label logarithmic scales with linear values for direct use. Any convenient log base may be used including $\log_{10}(x)$ or $\log_e(x)$ for natural logarithms. Exponential tags and measures may be used also.

Figure 18A:
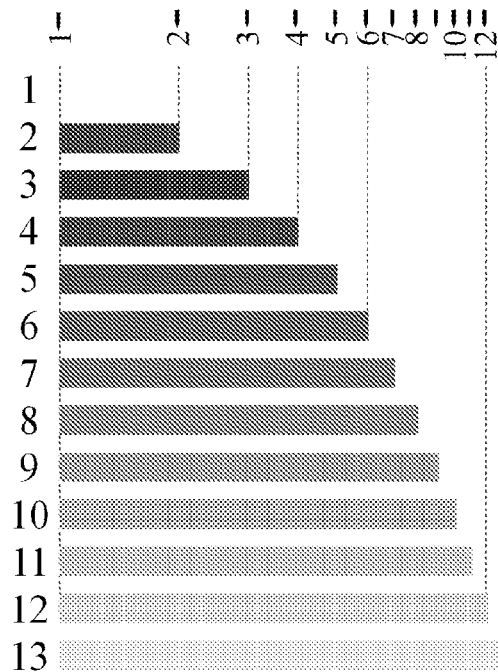
FIG. 18A illustrates a Set of Logarithmic Tags.
Figure 18B:
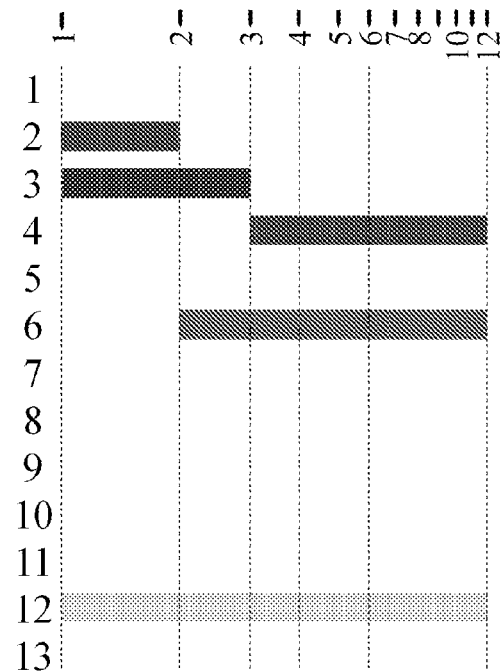
FIG. 18B illustrates a Multiplication and a Division using Logarithmic Tags.
Figure 18C:
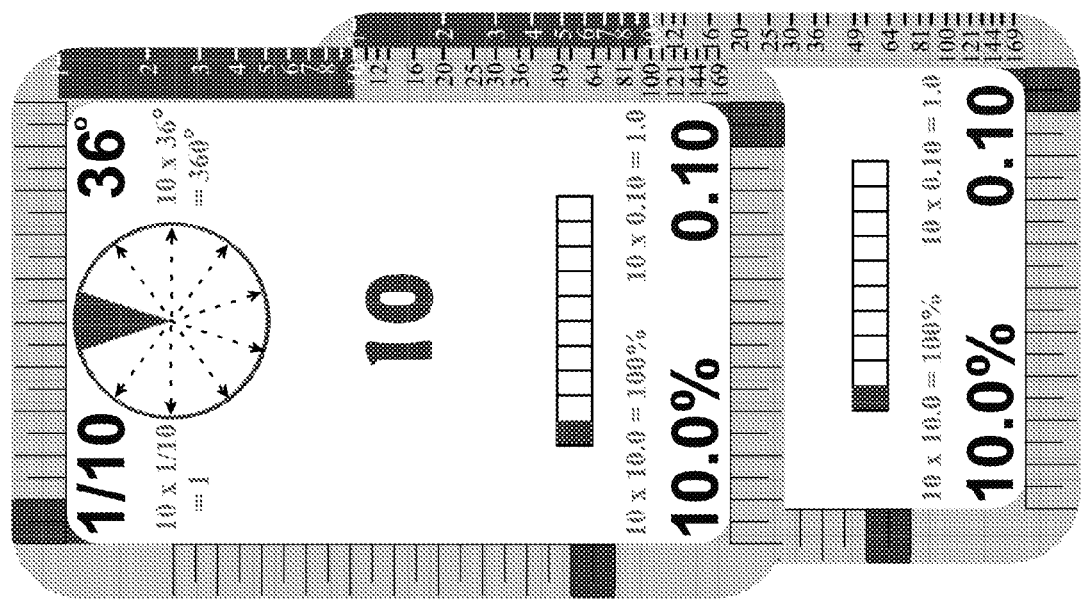
FIG. 18C illustrates a 10×10 Multiplication using Logarithmic Tags.

FIG. 18A shows tags representing face values of 1 through 13 scaled using a logarithmic base 10. It is evident from FIG. 18B that a #3 tag+a #4 tag=a #12 tag. So 3×4=12, 12/3=4 and 12/4=3. Similarly a #12 tag−a #6 tag=a #2 tag. So 12/6=2, 12/2=6, and 6×2=12. Also a #6 tag=a #2 tag+a #3 tag.

FIG. 18C illustrates a 10×10 multiplication. The 76 mm/3.0 in measure displays linear (x) values. The scale is $\log_{10}(x)$. Two $\log_{10}(10)$ tags align end to end. The end of the $2^{nd}$ tag indicates a product of 100 on the measure on the $1^{st}$ card. Thus 10×10=100. Note each card has just one logarithmic tag on an otherwise regular number-10 card (1/10$^{th}$ face value). Actual game cards will likely differ.

Mixed Tags

Game developers may offer card sets with several tag types for advanced applications. For example code each edge of a rectangular card for a different purpose. Preferably provide unequivocal play instructions.

Card Back Variants—FIGS. 5 & 6

There are many potential data sheets and card back variants depending upon game design. Card sets and backs may be customized. Backs may match the card deck or be a superset of several different decks in a collection. Segment data rows or ring sets may depict any winning combination of size- and color-coded segments. For example, two number-5 segments, a number-10, a number-3 and a number-6 segment.

Another option is to show segments from one radix in one half of a segment row or ring and use another radix in the second half. Or group radix-3 solutions, then radix-4, then radix-5. And so on.

Measure Variants

Rulers—Regular and Custom

FIGS. 3 & 17 show regular metric and imperial rulers. Custom rulers may be calibrated using a linear or logarithmic tag scale to quantify face values in any prevalent measurement or number system. The custom rulers shown in FIG. 17 use a 25.4 mm/ 1.0 in tag scale.

Hand-held Clip Measure—FIGS. 8A-D

Figure 8A:
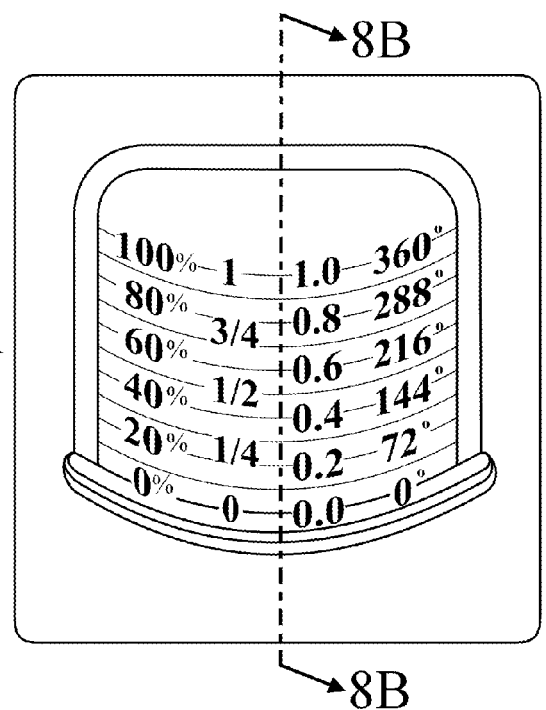
FIG. 8A illustrates a Hand-held Clip Measure $1^{st}$ alternative—Plan View.
Figure 8B:
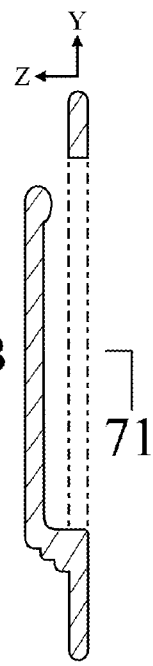
FIG. 8B illustrates a Hand-held Clip Measure $1^{st}$ alternative—Cross Section.
Figure 8C:
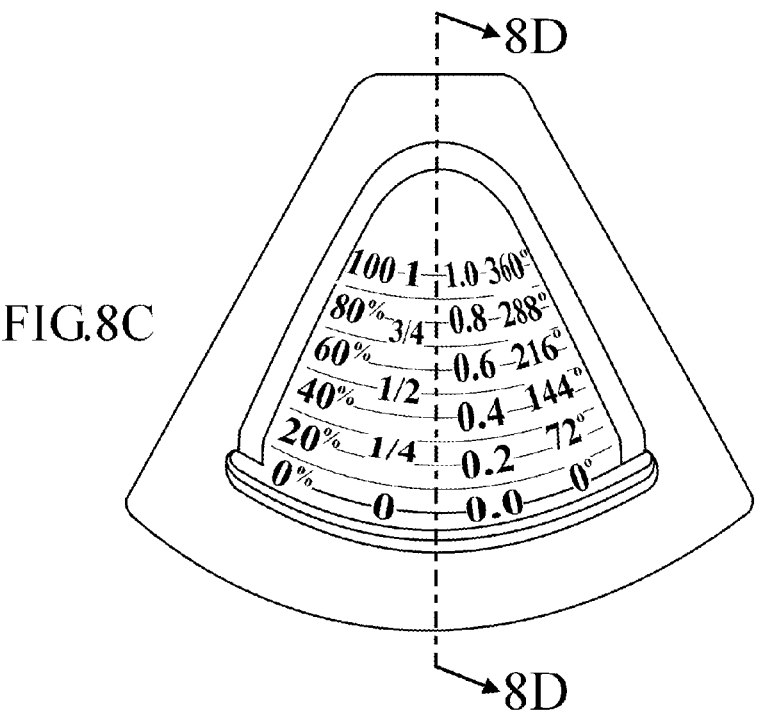
FIG. 8C illustrates a Hand-held Clip Measure $2^{nd}$ alternative—Plan View.
Figure 8D:
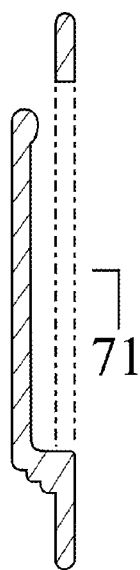
FIG. 8D illustrates a Hand-held Clip Measure $2^{nd}$ alternative—Cross Section.

FIGS. 8A & B show plan and sectional views of an alternative clip measure with four curved measures. The platform and clip interleave on three sides. Players may manipulate card backs through finger hole 71. It may be made in plastic or die stamped in metal, for example. Some players may find the triangular-shaped measure in FIGS. 8C & D easier to use. The shape is synergistic with round cards and pie-shaped segments.

Small Hand-held Clip Measure

Figure 10:
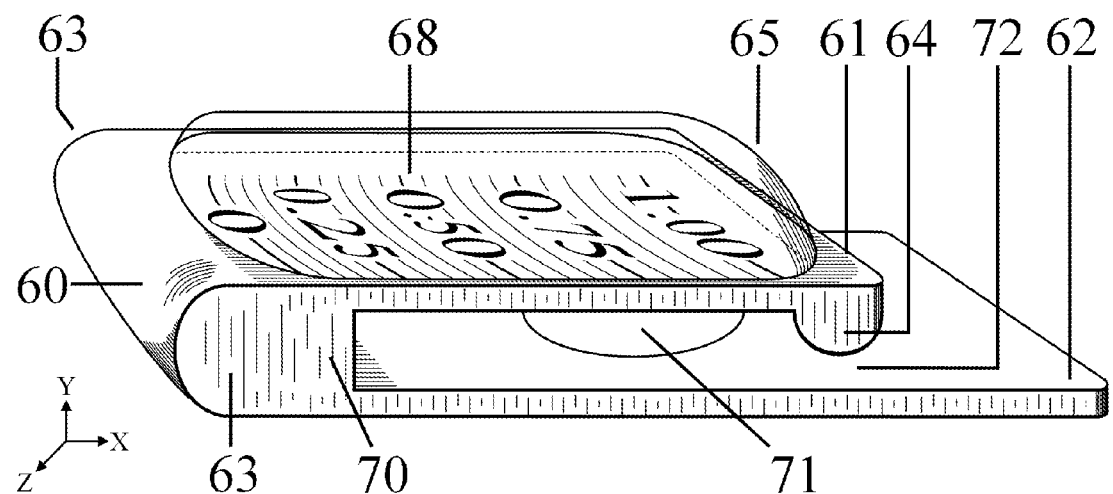
FIG. 10 illustrates a Small Hand-held Clip Measure—3-D View.
Figure 10:
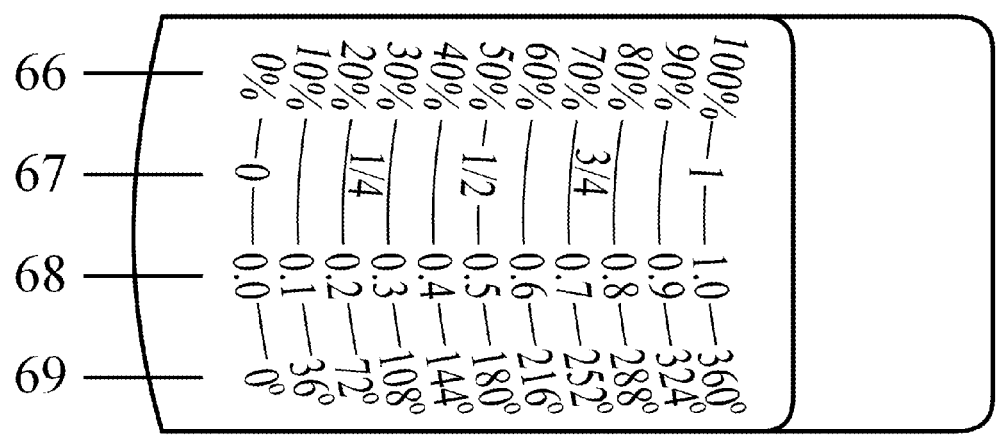

FIG. 10 depicts a 3-D view of a credit-card sized clip measure for round-shaped cards. It may be made in one piece in clear polycarbonate, acrylic or similar material. It converts a tag row directly into a total value in a prevalent measurement system. Players may manipulate card backs through a finger hole 71 in platform 62. A similar design not shown is suitable for rectangular cards.

Hinge 70 attaches clip 61 to body 60 above platform 62. Clamp 64 and platform 62 grip cards inside slot 72 as hinge 70 closes. An integrated magnifying lens 65 above measure 68 improves legibility and speeds use. Preferably measure 68 is molded on the inside surface of clip 61 to reduce potential parallax errors.

FIG. 10A shows a plan view of a small clip measure with curved measures 66, 67, 68 and 69. Players may switch interchangeably between different measures at will.

Using a Small Clip Measure

Figure 11A:
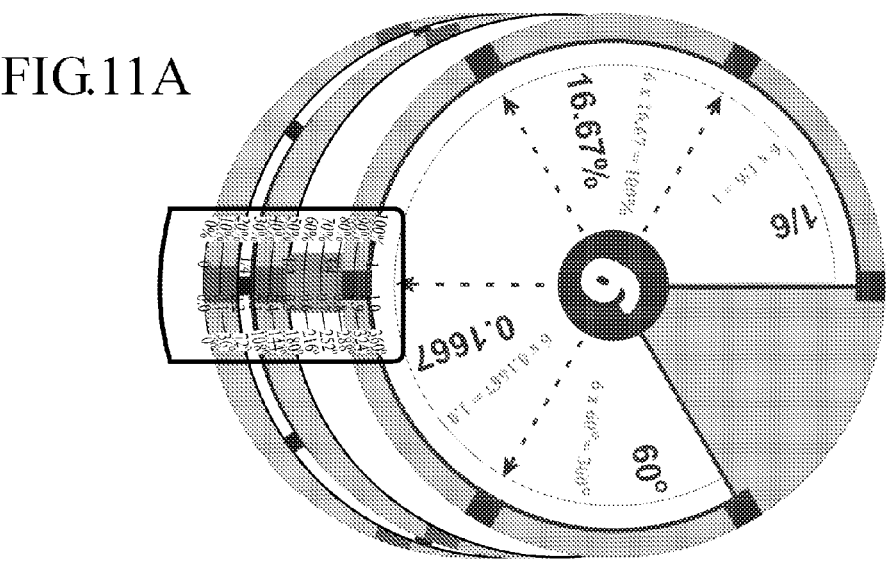
FIG. 11A illustrates a Using a Small Hand-held Clip Measure—Round Cards.

FIGS. 10 & 11A: using the same meld of cards shown in FIG. 3, proceed as follows:

hold small clip measure in one hand between finger and thumb using side grips 63;
with the other hand manipulate and measure melds inside slot 72;
slide a number-5 card inside slot 72 onto platform 62 and under clamp 64;
align a tag 42 with measure 68 zero;
press on lens 65 to secure the number-5 card under clip 61 and measure 68;
release lens 65, slide a number-10 card inside slot 72 on top of the first card;
align the outer curved edge of any tag 45 with the inner edge of selected tag 42 on the number-5 card;
press on lens 65 to secure both cards;
complete the meld in like manner with the number-5, -3 and number-6 cards, see FIG. 11A.

Figure 11B:
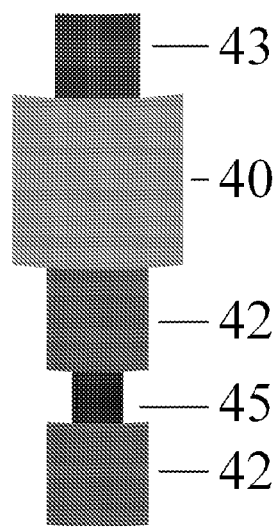
FIG. 11B illustrates a Group of Aligned Tags—Round Cards.

FIG. 11B shows a close-up of the contiguous row of five card tags 42, 45, 42, 40 and 43.

Figure 11C:
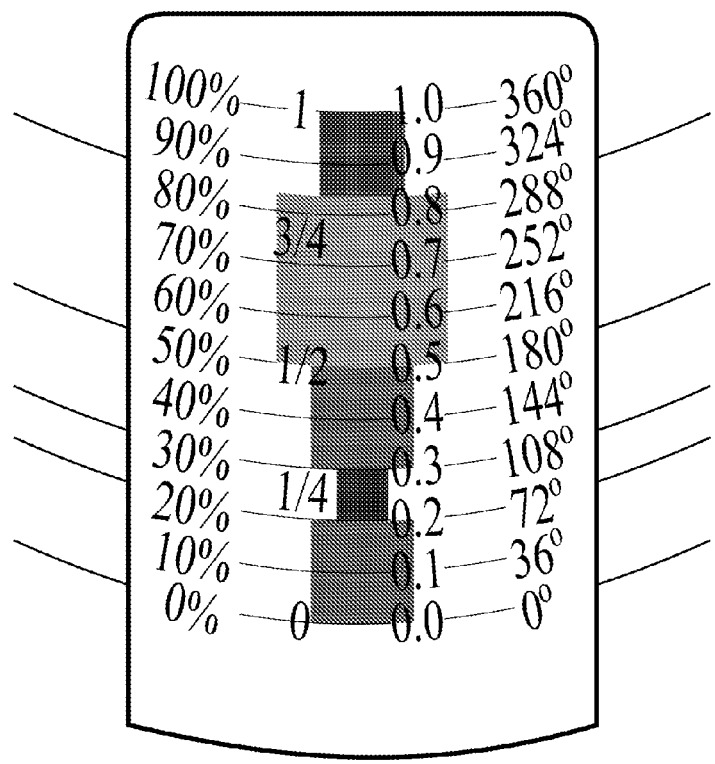
FIG. 11C illustrates a Using a Small Hand-held Clip Measure—Close-up View.

FIG. 11C is a close-up plan view of the measure and tags showing a group value of 100%, 1/1, 1.0 and 360°.

Developers may select clip and font sizes suited to hand size, dexterity and eyesight of their target audience. Note that although children generally have smaller hands and better eyesight than adults do, young children may not have developed the required motor skills to handle very small clip measures.

Measure with Card Slot—Slot Measures

A measure with card slot or slot measure encloses a whole card group. It is intended for tabletop use but may be handheld. Slot measures offer little privacy in a competitive game situation. An appropriately sized slot may accommodate any card shape and meld size. Tags may be scaled in either or both dimensions. The slot may be a hole or an indent. Slots may be calibrated inside and outside to show meld value.

Slot Measure for Round Cards—Tags Scaled in Radial Height, FIG. 13A

A slot measure comprises a solid body 60 containing a calibrated card slot 72. It may be made from any material customarily used for rulers and drafting tools. Slot 72 is an appropriately sized indented slot or hole with semi-circular or card-shaped ends. Slot 72 sides are parallel. It may be calibrated for right-handed or left-handed, or right and left-handed, players. It may be single or double-sided.

Preferably slot 72 width just exceeds one card diameter. This allows for easy card placement and removal and reduces card wear and tear. Body 60 thickness and slot 72 depth depend upon card thickness and capacity. The minimum slot depth should hold a stack of six to eight cards, for example. Preferably an indented slot measure has a finger hole 71 to facilitate card manipulation and removal.

To accommodate a meld of one whole unit, the minimum slot length should just exceed one card diameter plus one tag scale. It is not essential to calibrate a minimum-length slot. Any group of cards that total one whole unit (whose tags total one tag scale) plus one extra card would fill the slot exactly. Preferably the slot is calibrated with several prevalent measurement systems however to promote learning.

The measure in FIG. 13A is intended for right-handed players working from left to right. It has decimal measure 68 in the upper left and fraction measure 67 in the lower left corner. Two measures are inverted. Players may rotate the measure 180° to use percentage measure 66 or degree measure 69. Two internal measures help to reduce potential parallax errors due to peripheral measures. Composite curved measures 74 and 75 show group value progress towards and needed to complete one whole unit.

Players may orient the slot measure at any angle such as at 3, 6, 9 and 12 o'clock. Left-handed players may find it easier to work from the right. The other side of the measure (not shown) has upright measures 68 and 67 on the right and inverted measures 66 and 69 on the left.

Using a Slot Measure

Figure 13B:
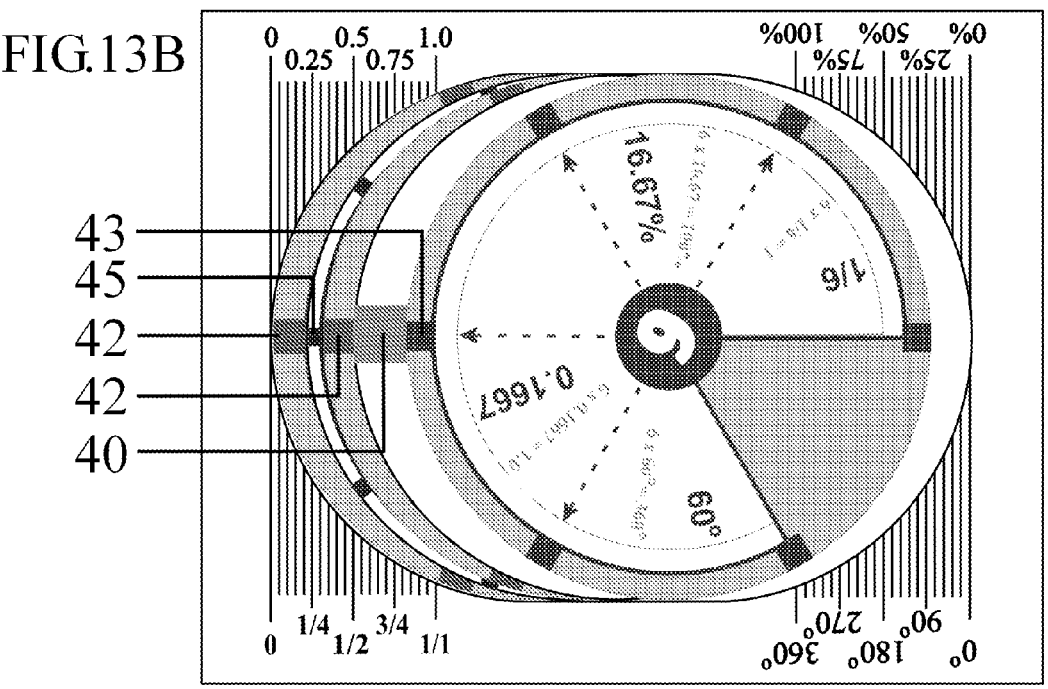
FIG. 13B illustrates a Using a Slot Measure.

FIG. 13B shows using a slot measure with the same meld of five cards as used in FIG. 3:
lay the slot measure horizontally on a tabletop or suitable flat surface;
select measure 66-69 and rotate body 60 accordingly;
feed successive cards into slot 72 with one hand;
align the outer edge of each successive tag with the inner edge of its predecessor;
use other hand to hold body 60 and to secure the row of aligned cards and tags;
read total meld value on selected measure;
remove cards from slot measure by turning it over and emptying it, or push the cards out of the slot from the other side using finger hole 71.

Opaque cards obscure measures 74 or 75 and potentially render them useless.

Proceed as follows:
select either measure 74 or 75 but work from the opposite end of the slot;
align cards and tags inside the slot to form a contiguous row of aligned tags as above;
take any extra card and align its leading edge with the end of the row of aligned tags;
use the trailing edge of the extra card to read meld value directly on selected measure.

Figure 14A:
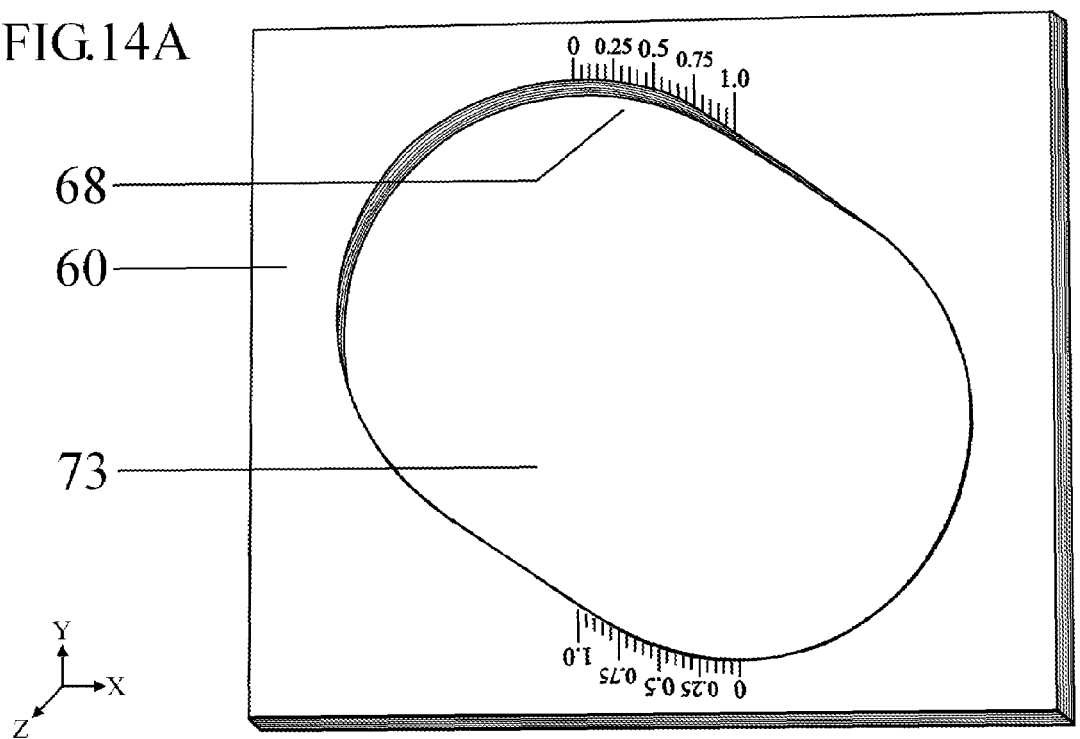
FIG. 14A illustrates a Inclined Slot Measure.

Inclined Slot Measure—Tags Scaled in Width, FIG. 14A

Inclined slot measures are intended for use with tags scaled in width only (e.g., for small segments). An inclined slot automatically offsets adjacent cards in two directions. The offset exposes successive tags in the alignment and measurement process. Tag-width sets the offset between adjacent round cards in a group of aligned cards.

Preferably developers should design tags, slot inclination and measure placement together.

Body 60 contains an inclined slot 73 calibrated with measure 68. Any other measure may be used. Slot 73 may be calibrated top and bottom. The slot measure may be calibrated on both sides.

Figure 14B:
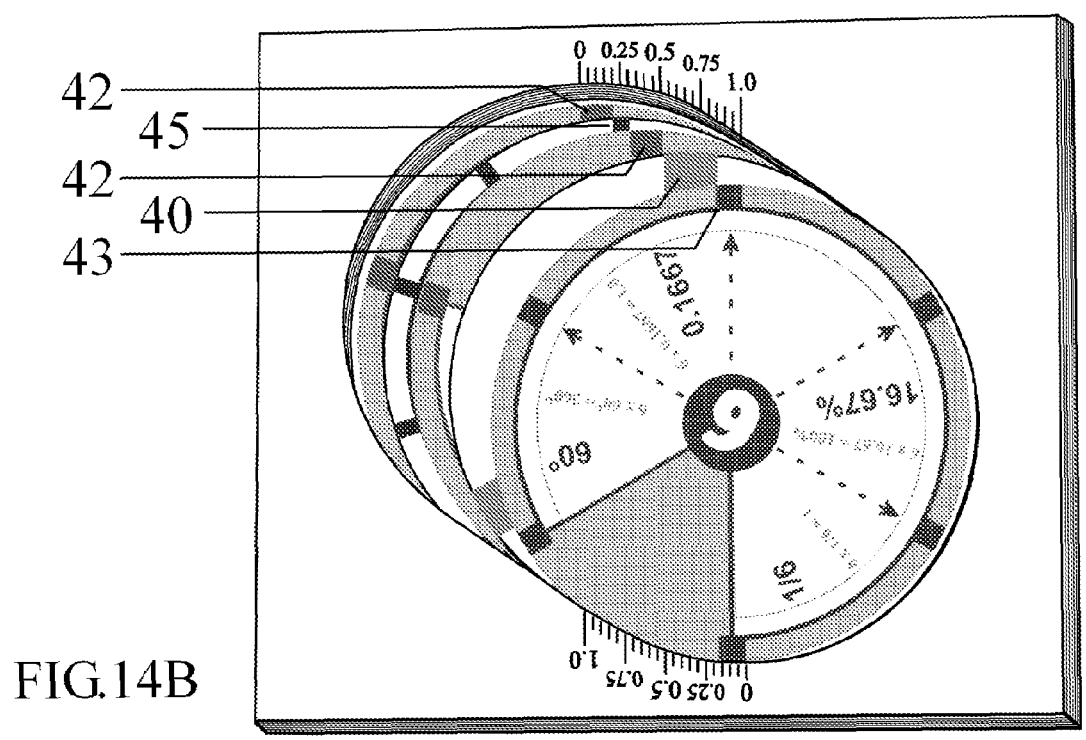
FIG. 14B illustrates a Using an Inclined Slot Measure.

Using an Inclined Slot Measure—FIG. 14B

FIG. 14B shows an inclined slot measure with the same meld of five cards used in FIG. 3. Place cards inside the slot in sequence from left; offset and align selected tags 42, 45, 42, 40 and 43 side by side at 12 o'clock.

Template Measure

A low cost template measure may be inscribed on paper or suitable transparent material. Players may meld cards on top of a template measure or overlay a transparent template measure over a pre-aligned meld.

Figure 12B:
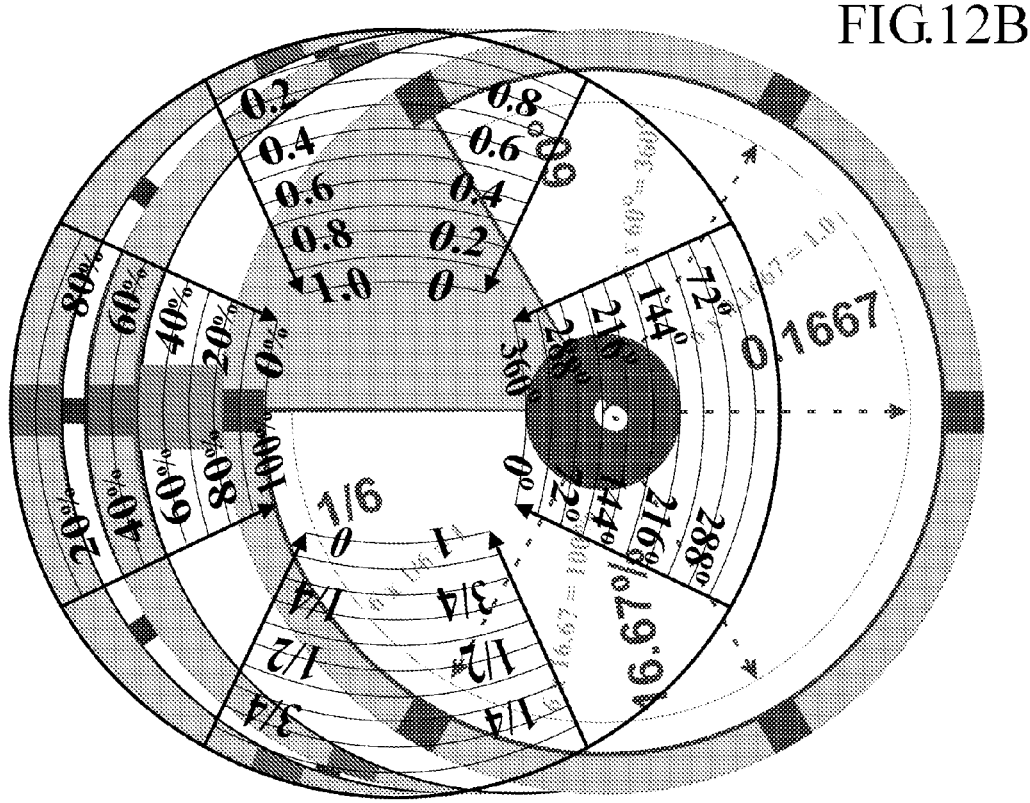
FIG. 12B illustrates a Using a Transparent Template Measure—Round Cards.

FIG. 12A shows a round card-sized transparent template measure with four double measures 76, 77, 78 and 79. Place it over pre-aligned melds to read meld values, see FIG. 12B. Each double measure shows group face value achieved and needed to complete one whole unit.

FIG. 15 shows a template measure with a notional slot calibrated with measures 66, 67 68 and 69 outside a notional slot, and with composite curved measures 74 and 75 inside.

Alternative Graphic Representations

Pie charts, bar charts, histograms, frequency diagrams, lines, dots, images, icons or any suitable graphical representations may be used to depict rank and size relationships. Bar charts are synergistic with rectangular-shaped cards and pie charts with round-shaped cards.

Playing Piece Variants

Some applications may require more durable playing pieces than regular playing cards. Plastic card stock or tiles may be preferred for child use.

Virtual Playing Pieces

A virtual deck of playing card images may be electronically stored in any computing device, cell phone or online system for individual or group play.

Conclusions, Ramifications and Scope

These specially marked playing cards offer many ways for players of any age, math proficiency and cultural background to acquire an understanding of fractions decimals percentages and degrees, and their interrelationships, and to determine a group value just through play.

While my above description contains much specificity, this should not be construed as a limitation on the scope of the invention, but rather as an exemplification of some preferred embodiments thereof.

Although round-shaped or rectangular-shaped cards are preferred any card shape may be used.

A preferred embodiment uses seven interchangeable indicia types and color-coding to denote face value. Developers may use any number of indicia types, and any number of indicia, to denote face value. Color-coding is optional. Also shape-coding may be desirable for certain applications, and so on.

Further, the indicia need not be limited to visual components only. Auditory, olfactory, tactile and even taste indicia may be utilized for specific applications, especially for special needs applications.

The indicia may be expanded to use other symbol sets, for example Greek, Cyrillic, Katakana and Kanji.

The indicia may be expanded to use words and language and not just symbols. For example, the fraction ¼ may be written as the word quarter in English, un quart in French, un quarto in Spanish, and so on.

The game system is not limited to single portions. Multiple portions and mixed numbers may be supported.

This arithmetic measurement system is not limited to numbers. fractions, decimals, percentages, and degrees. Rather it has general applicability for all measurement or number systems and conversions. It may be adapted to any measurement system including but not limited to weights and mass, distance and length (land and nautical), capacity and volume, area, speed, time, temperature, pressure, energy and work, power, torque, circular measure, computer storage, fuel consumption, currency conversion and any other unit conversion.

Global markets may require international measurement system conversions. This system may be adapted to U.S. gallons, quarts, pints, cups and ounces. It may be used with international liquid and dry measures of volume including metric, U.S., British Imperial, Japanese, Thai, Old Russian and cooking units.

As noted this game system is not limited to addition and subtraction but rather it has general math applicability including multiplication, division, logarithms and exponentiation.

Playing pieces may be electronically tagged or coded. An electronic measuring device could sense, identify and count electronic tags and so replace mechanical measures. This would greatly simplify card alignment, counting and meld value assessment especially for physically challenged or handicapped players.

Also microelectronic processor and storage components may be embedded in the playing pieces similar to the so-called smart card. They may be programmed to store, manipulate process and retrieve machine-readable data. This would greatly expand the range and complexity of potential applications.

Accordingly, the scope of the invention should be determined not by the embodiment(s) illustrated, but by the appended claims and their legal equivalents.

The invention claimed is:

1. A method of determining a mathematical value using an arithmetic measurement system comprising:
 a) providing a plurality of playing cards, each containing at least one tag scaled in one or two dimensions using a predetermined tag scale selected from a linear tag scale and a logarithmic tag scale, wherein the tag scale represents a face value;
 b) providing a measure calibrated in accordance with said predetermined tag scale, whereby users may add, subtract, multiply, and divide, said face values to obtain a group value by aligning abutting or overlapping tags, one from each card in an arithmetic operation, wherein said measure is used in a measurement to quantify:
  i. a contiguous row of two or more said tags each scaled according to said linear tag scale to add two or more said face values, or each scaled according to said logarithmic tag scale to multiply two or more said face values;
  ii. a difference in said size-coded dimension between two said tags each scaled according to said linear tag scale to subtract one said face value from another, or each scaled according to said logarithmic tag scale to divide one said face value by another; and
  iii. a difference between two contiguous rows of one or more said tags, each scaled according to said linear tag scale to subtract a first group value from a second group value, or each scaled according to said logarithmic tag scale to divide said second group value by said first group value;
 c) wherein said tag is close to an edge of said card, and the orientation and position of the start of said tag is identical on all said cards, whereby users identify said tags on all said cards, and overlap and stagger a group of said cards to expose and align said tags one from each card;
 d) wherein said cards are substantially rectangular in shape with straight sides and with rounded corners, whereby said cards are aligned during measurement by overlaying and offsetting a second card on top of a correspondingly oriented first card, or by rotating said second card 180° and abutting corresponding edges of a first card and second card by aligning said tags one from each card;
 e) wherein users quantify a correctly aligned group of said cards and read group value directly on said measure, wherein said measure is an integrated measure located on an edge of said card, and whose origin is aligned with said tag scaled in one dimension only along said edge of said card, whereby said tag registers said face value on said integrated measure, and users quantify a correctly aligned group of said cards and read group value directly and without requiring a separate said measure, wherein said measure is an integrated measure selected from a group consisting of decimal measure, percentage measure, fraction measure and degree measure located on the back of said cards, and aligned with segment bar charts, whereby users may choose an integrated measure located on the back of said cards to quantify a correctly aligned group of said cards and read group value directly without requiring a separate said measure;

f) wherein said measure is a clip measure, separate from said cards, comprising:
  i. a compound lever, a first lever or card platform small enough to fit in the palm of one hand, joined at a fulcrum by a hinge to a nominally tongue-shaped second lever or clip and enclosing a card slot oriented in a plane parallel to the surface of said card platform, wherein said card platform comprises two nominally flat surfaces, an upper surface and a lower surface of similar size and shape;
  ii. two nominally flat surfaces, an upper surface and a lower surface of similar size and shape, and a fixed proximal end attached by said hinge to said card platform and a free distal end with limited movement in a plane perpendicular to said card platform, wherein said card slot is a void bounded by the upper surface of said card platform at bottom and by the lower surface of said clip at top, and is open on two sides and at one end, and is bounded by said hinge at the other end, and is of sufficient size to partially enclose a group of said cards resting on, and in a plane substantially parallel to, said card platform and underneath said clip; whereby said group of said cards may be held inside said clip measure just by squeezing said clip and said card platform together using a first hand, or released by relaxing pressure on said clip, and rearranged aligned and removed from said card slot by a second hand, and quantified on said measure.

2. The method claim 1 whereby a group of said cards is manipulated by inserting at least one finger from behind said card platform through said finger hole.

* * * * *